US009159152B1

(12) United States Patent
Glover et al.

(10) Patent No.: US 9,159,152 B1
(45) Date of Patent: Oct. 13, 2015

(54) MAPPING BETWEEN A CAPTURE VOLUME AND A VIRTUAL WORLD IN A MOTION CAPTURE SIMULATION ENVIRONMENT

(75) Inventors: Robert Michael Glover, Marietta, GA (US); Nels Howard Madsen, Auburn, AL (US); Thomas Michael McLaughlin, Miramar Beach, FL (US)

(73) Assignee: Motion Reality, Inc., Marietta, GA (US)

( * ) Notice: Subject to any disclaimer, the term of this patent is extended or adjusted under 35 U.S.C. 154(b) by 374 days.

(21) Appl. No.: 13/551,173

(22) Filed: Jul. 17, 2012

Related U.S. Application Data

(60) Provisional application No. 61/508,858, filed on Jul. 18, 2011.

(51) Int. Cl.
G06T 13/40 (2011.01)
G06T 13/00 (2011.01)

(52) U.S. Cl.
CPC ............ *G06T 13/40* (2013.01); *G06T 13/00* (2013.01); *A63F 2300/6607* (2013.01)

(58) Field of Classification Search
USPC ............... 715/765; 345/156; 348/53; 463/42
See application file for complete search history.

(56) References Cited

U.S. PATENT DOCUMENTS

| | | | |
|---|---|---|---|
| 2004/0174431 A1* | 9/2004 | Stienstra ..................... 348/155 |
| 2008/0018595 A1* | 1/2008 | Hildreth et al. ............. 345/156 |
| 2008/0030460 A1* | 2/2008 | Hildreth et al. ............. 345/156 |
| 2009/0221374 A1* | 9/2009 | Yen et al. ...................... 463/42 |
| 2009/0278917 A1* | 11/2009 | Dobbins et al. ............... 348/53 |
| 2010/0164946 A1* | 7/2010 | Hyndman ..................... 345/419 |
| 2010/0277411 A1* | 11/2010 | Yee et al. ..................... 345/156 |
| 2010/0306685 A1* | 12/2010 | Giaimo et al. ................ 715/765 |
| 2011/0009241 A1* | 1/2011 | Lane et al. ....................... 482/8 |
| 2011/0099476 A1* | 4/2011 | Snook et al. ................. 715/728 |
| 2011/0175801 A1* | 7/2011 | Markovic et al. ............ 345/156 |

* cited by examiner

*Primary Examiner* — Phi Hoang
(74) *Attorney, Agent, or Firm* — King & Spalding LLP

(57) ABSTRACT

A motion capture simulation system can include a capture volume. A participant disposed in the capture volume can be motion captured and immersed into a virtual environment. The virtual environment may be larger in size than the capture volume. In the virtual environment, the participant may be represented by an avatar. The avatar in the virtual environment can be moved in a first direction based on a motion of the participant in the first direction in the capture volume. As the participant moves in the first direction in the capture volume, the participant may approach a boundary of the capture volume, while the participant's avatar may have space to move further in the first direction in the larger virtual environment. Approaching the boundary, the participant can change direction, for example turning around to avoid the boundary. The redirected participant can continue driving the avatar to move in the first direction.

16 Claims, 16 Drawing Sheets

MAPPING BETWEEN A CAPTURE VOLUME AND A VIRTUAL WORLD IN A MOTION CAPTURE SIMULATION ENVIRONMENT

CROSS REFERENCE TO RELATED APPLICATIONS

This application claims priority to U.S. Provisional Patent Application No. 61/508,858 filed Jul. 18, 2011 in the name of Robert Michael Glover, Nels Howard Madsen, and Thomas Michael McLaughlin and entitled "Mapping between the Motion Capture Volume and the Virtual World," the entire contents of which are hereby incorporated herein by reference.

This application is related to U.S. patent application Ser. No. 13/551,183, filed Jul. 17, 2012, in the name of Robert Michael Glover, Nels Howard Madsen, and Thomas Michael McLaughlin and entitled "Mapping between a Capture Volume and a Virtual World in a Motion Capture Simulation Environment," the entire contents of which are hereby incorporated herein by reference.

FIELD OF INVENTION

This disclosure relates generally to a technical field of simulation systems and, in one example embodiment, to a system, method and an apparatus for mapping between a capture volume and a virtual world in a motion capture simulation environment.

BACKGROUND

Training in realistic situations often yields substantial performance improvement. With conventional technology, such realistic training can pose high risk to a participant, especially if the training involves performance of potentially dangerous tasks or operations in hostile and/or potentially threatening environments. So, to provide the participant with a reduced risk environment for training, the realistic situation can be simulated using motion capture. The term 'motion capture' as used herein generally refers to capturing any appropriate motion of an object in the real world using appropriate sensors and translating the motion in the real world to a motion in the virtual environment (which can also be characterized and interchangeably referred to as a virtual world).

In a motion capture simulation, typically a real world environment may be mapped to a virtual environment. Further, the real world environment may be different in proportion compared to the virtual environment. For example, the real world environment that is mapped to the virtual environment may be the size of a basketball court, while the corresponding virtual environment may be size of a large town. The difference in proportion may hinder a seamless movement in the virtual environment because the movement in the real world may be limited to the confines of the real world. For example, the movement of a participant in the real world may be limited within the boundaries of a room while the corresponding virtual environment is much larger than the room. The hindrance to the seamless movement in the virtual environment may affect a performance improvement of the participant. In view of the foregoing discussion of representative shortcomings, need for improved mapping from the real world to the virtual environment is apparent.

SUMMARY

A motion capture system can include a capture volume. Further, the capture volume can be mapped to a virtual environment. In addition, a participant disposed in the capture volume can be motion captured and immersed in a virtual environment. In the virtual environment, the participant can be represented by an avatar. The avatar in the virtual environment can be moved based on a movement of the participant in the capture volume by motion capture data associated with the participant.

The term 'capture volume' as used herein generally refers to a physical volume of space that may or may not be confined by a boundary and that is under surveillance of one or more devices that can capture appropriate motion. A capture volume may be contiguous or in multiple parts that are remote from one another and linked through networking technology.

The term 'virtual environment' as used herein generally refers to an environment generated, produced, created, or rendered by one or more computer systems. The virtual environment can comprise a mapping of the capture volume. In some embodiments, the virtual environment and the capture volume can be mapped one on one. In other embodiments, the virtual environment may be a scaled version of the capture volume. For example, the capture volume may be a 100×50 feet space, whereas the virtual environment that is a scaled mapping of the capture volume may be the size of a large city.

The term 'avatar' as used herein generally refers to representation of the participant in the virtual environment that is computer generated and driven by the participant in the capture volume. The avatar can have a living human counterpart that is active during the simulation. In some embodiments, the term 'avatar' can refer to a representation of an object in the virtual environment that is computer generated and driven by the object in the capture volume.

As the participant moves in the capture volume, the participant may approach a boundary of the capture volume. In one aspect, a simulator engine of the motion capture system may determine if the participant is approaching a boundary of the capture volume. On a positive determination that the participant is approaching a boundary of the capture volume, the simulator engine can change a correlation between the movement of the avatar in the virtual environment and the movement of the person in the capture volume.

The term 'correlation' as used herein may generally refer to any appropriate mutual relation between the movement of the avatar in the virtual environment and the movement of the participant in the capture volume. For example, correlation can refer to relation where moving an avatar in a first direction in the virtual environment may be based on a motion of the participant in the first direction in the capture volume. In the example, when the correlation of movement is changed, the avatar can be continued to be moved in the first direction in the virtual environment while the participant moves in a second direction in the capture volume. The second direction may be different from the first direction.

In another aspect, a simulator engine can be configured to move the avatar in a direction in a virtual environment based on movement of the participant in the direction in a capture volume. Further, the simulator engine can be configured to determine if the participant is in a threshold distance from a boundary of the capture volume. If the participant is in the threshold distance, then the simulator engine may be configured to provide an indication to the participant's head mounted display that the participant is in a threshold distance from the boundary in the capture volume. Further, the participant may change a direction of movement in the capture volume to another direction of movement such that the participant moves away from the boundary. Even if the participant changes a direction of movement, the simulator engine can be configured to move the avatar in the direction based on movement of the participant in the another direction.

In yet another aspect, a method of moving an avatar in a virtual environment based on motion of a person in a capture volume may include moving an avatar along a vector responsive to the person moving in a first direction while disposed in the capture volume. In addition, the method may include moving the avatar along the vector in the virtual environment based on the person moving in a second direction in the capture volume. The first direction may be different than the second direction. Further, when an activity in one region of the virtual environment is completed, the participant in the capture volume may change a direction of movement in the capture volume to change an operational environment from one region to another region in the virtual environment.

The foregoing discussion of mapping between a capture volume and a virtual environment in a motion capture simulation environment is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

Example embodiments are illustrated by way of example and not limitation in the figures of accompanying drawings, in which.

Figure 1:
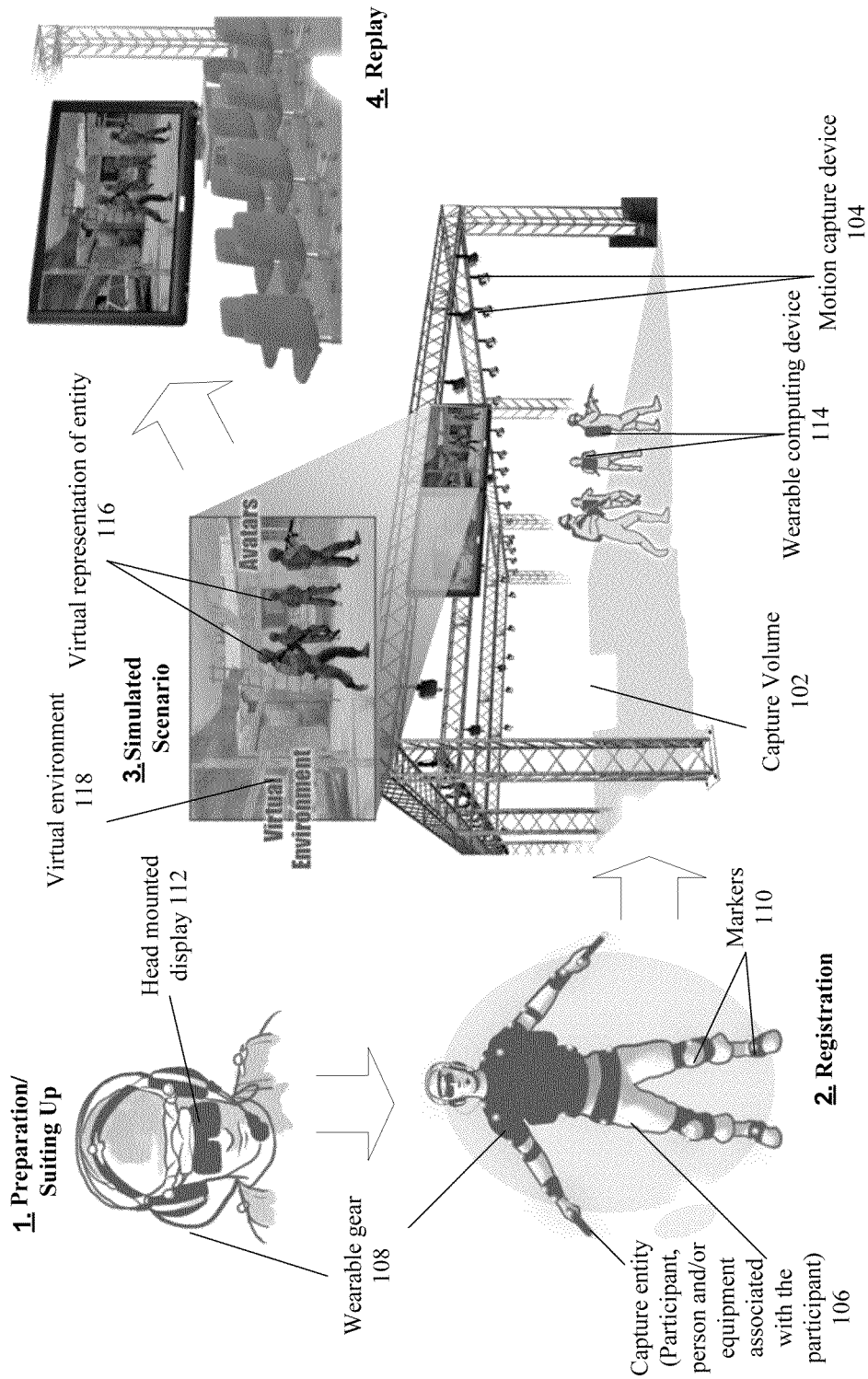
FIG. 1 illustrates an exemplary motion capture simulation system, according to certain exemplary embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from accompanying text, including the Detailed Description that follows.

DETAILED DESCRIPTION

Disclosed are a system and method for mapping between a capture volume and a virtual environment in a motion capture simulation environment. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

In a motion capture simulation system, participants in a capture volume can be immersed in a three-dimensional virtual reality environment (hereinafter "virtual environment") where each participant is represented by a respective virtual representation (hereinafter "avatars"). The motion of the participants in the capture volume may be captured using a motion capture device. The corresponding motion capture data can be used to drive the participants' respective avatars in the virtual environment. In other words, the motion capture data can be used to characterize with high fidelity the movements and actions of the participants, which are immediately and accurately, translated into corresponding movements and actions of the participants' avatars. In addition, the virtual environment may include virtual characters or objects that are controlled using artificial intelligence algorithms. Further, the avatars may interact with the virtual characters or objects.

The motion capture simulation system can provide a sensory immersive experience to the participant by providing various sensory feedback signals to the participants. The sensory feedback signal provided to the participants can be adapted to the perspective and configuration of the respective participant's avatar. The various sensory feedback signals can include visual, audio, tactile and olfactory feedback. The various sensory feedback signals can be generated based on the motion capture data and other physiological data from the participants in the motion capture simulation system.

The motion capture data of a participant can be used to model, inter alia, a visual field of view and a surround sound audio effect as perceived by the participant's avatar in the virtual environment. The modeled field of view and the surround sound audio effect may be transferred to the participant in the motion capture simulation system as visual and audio feedback respectively, to provide the participant with a sensory immersion experience into the virtual environment. The participants can receive the various sensory feedback signals using a wearable computing device donned by each of the participants. The wearable computing device can be adapted to receive the feedback signals, process it when needed and transfer the feedback signal to the participant through adapted feedback communication devices.

In one embodiment, the feedback communication devices can be attached to the participant. For example, a muscle stimulation sensor may be attached to the participant to receive a tactile feedback signal. In another embodiment, the feedback communication devices can be disposed in the capture volume having the participants. For example, surround sound speakers may be disposed in the capture volume. In one example embodiment, the visual feedback can be provided as a first person stereoscopic point of view (POV) display to a participant using a head mounted display device (HMD). In another example embodiment, the audio feedback can be provided as a surround sound effect customized to the perspective of the participant's avatar through a pair of headphones.

The participants immersed in the virtual environment can interact with each other, virtual props in the environment and virtual characters. In addition, the participants can take part in various activities in the virtual environment. The term 'virtual character' as used herein, may generally refer to a character in the virtual environment that is computer generated and computer driven. Further, a virtual character is one that does not have a living human counterpart that is active in the simulation during the simulation. Hereinafter, the term virtual character may be referred to as an AI character.

In some embodiments, the capture volume may be enclosed by boundaries such as, inter alia, walls or other similar structures. Frequently it is desirable that the virtual environment extends over a nearly infinite volume while the corresponding capture volume in the real world may be constrained by the boundaries of the capture volume.

When the participant moves in the capture volume, the participant may reach a boundary of the capture volume. In other words the participant's movement in the capture volume along a certain direction may be hindered by the boundary while there is still more distance to cover in the corresponding larger virtual environment.

In one embodiment, the constraints of the capture volume may be overcome by the participant changing a direction of movement when the participant approaches a boundary of the capture volume. When the participant is approaching the boundary of the capture volume, the participant may be alerted of the approaching boundary. In response to the alert, the participant may change a direction of movement in the capture volume in such a way that the participant moves away from the boundary. For example, a participant moving forward (south to north direction) and reaching a wall that is perpendicular to the direction of motion of the participant, may turn around (e.g., 180 degree) and start moving in the opposite direction (north to south direction) to avoid being restricted by the wall.

In response to the participant changing a direction of movement in the capture volume, the virtual environment may be reoriented in such a way that the effect of the change in direction in the capture volume may not be reflected in the virtual environment. In another embodiment, in response to the participant changing the direction of movement in the capture volume, transformations can be applied to the motion capture data of the participant to cancel, in the virtual environment, an effect of the change in direction in the capture volume. For example, a participant's avatar may be moved in a north-south direction in the virtual environment based on a north-south movement of the participant in the capture volume. To avoid being constrained by a wall in the capture volume the participant may turn back and move in a south-north direction in the capture volume. Once the participant turns back and moves in a south-north direction, typically the participant's avatar is turned around and moved in the south-north direction in the virtual environment based on the motion capture data. However, in the present invention when the participant changes direction due to constraints of the capture volume, transformations are applied to the motion capture data that causes the participant's avatar to continue moving in the north-south direction in the virtual environment despite the participant moving in the south-north direction in the capture volume. One of ordinary skill in the art can understand and appreciate that even though the example embodiment describes moving in the opposite direction to avoid being constrained by an impending boundary of the capture volume, the participant can move in any desired direction that allows the participant to avoid the impending boundary without departing from the broader spirit of the invention.

In some embodiments, responsive to alerting the participant of an approaching boundary, the virtual environment may be reoriented in such a way that encourages the participant in the capture volume to change directions in the capture volume.

In another embodiment, the constraints of the capture volume may be overcome by mounting the participant on a structure (hereinafter 'platform') in the capture volume. The platform in the capture volume may represent a platform associated with a virtual vehicle in the virtual environment. The term virtual vehicle as used herein may include virtual devices in the virtual environment that transport individuals and/or objects on or below ground in the virtual environment, on or through fluids (water) in the virtual environment, and above the ground (e.g., air, space) in the virtual environment, or a combination thereof. A few examples of vehicle in the virtual environment may include, inter alia, a helicopter, a motorbike, a boat, a submarine, a golf cart, a car, a jeep, a tank, a plane, or a horse.

In an example embodiment, the platform in the capture volume may be a stationary structure that the participants can mount on. In another example embodiment, the platform may be fixed at a location in the capture volume, but may be adapted to generate roll, pitch and yaw movement as experienced by the virtual platform in the virtual environment. In other words, the platform may be mobile about a fixed location, the platform may pivot about a fixed location, and/or may be capable of limited translator movements. In some embodiments, the platform can move through the capture volume, for example from one end to another. The roll, pitch and yaw movement of the platform in the capture volume may closely replicate a sensation of riding the respective vehicle in the virtual environment providing a sensory immersive experience to the participant in the capture volume and draw the participant to believe that the participant's experience in the virtual environment is real.

Once the participant mounts the platform, using transformation algorithms, the participant in the capture volume may be coupled to the virtual vehicle in the virtual environment. The participant's avatar may be coupled to the virtual vehicle in the virtual environment by mapping the participant on the platform in the capture volume to the virtual vehicle in the virtual environment. Once the participant's avatar is coupled to the transportation in the virtual environment, the participant's avatar may move around in the virtual environment using the virtual vehicle, while the participant remains on the platform in the capture volume. In one embodiment, moving the participant's avatar in the virtual environment using the virtual vehicle may include iteratively (or continuously) mapping the participant (on the platform) in the capture volume to the virtual environment. In an example embodiment, different transformations may be used for moving through the virtual environment using the virtual vehicle and dismounting the virtual vehicle.

Technology for mapping between a capture volume and a virtual environment in a motion capture simulation environment will now be described in greater detail with reference to FIGS. 1-14, which describe representative embodiments of the present invention. FIGS. 1, 2, 3, 4 and 5 describe a representative motion capture simulation system, as an exemplary embodiment of a motion capture simulation environment. FIGS. 6-11 describe extending a participant avatar's operational space in the virtual environment using a transportation platform using suitable illustrations and flowcharts. Further, FIGS. 12-14 describe extending a participant avatar's operational space in the virtual environment by changing a participant's direction of movement in a capture volume using suitable illustrations and flowcharts.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Moving now to discuss the figures further, an exemplary embodiment of the present invention will be described in detail. First, FIGS. 1-5 will be discussed in the context of describing a representative operating environment suitable for practicing certain embodiments of the present invention. FIGS. 6-11 will be discussed, making exemplary reference back to FIGS. 1-4 as may be appropriate or helpful. Further, the remaining FIGS. 12-14 will be discussed, making exemplary reference back to FIGS. 1-4 as may be appropriate or helpful.

As further discussed below and in accordance with certain embodiments of the present invention, FIG. 1 illustrates an exemplary system that is useful for motion capture simulation, while FIGS. 2, 3, 4, and 5 illustrate exemplary system elements.

Referring now to FIG. 1, this figure illustrates an exemplary motion capture simulation system 100, according to certain exemplary embodiments of the present invention. In particular, FIG. 1 illustrates a capture volume 102, a motion capture device 104, a capture entity 106, a wearable gear 108, makers 110 coupled to the wearable gear 108, a head mounted display device (hereinafter "HMD" device) 112, a wearable computing device 114, a virtual environment 118, and an avatar 116.

A motion capture simulation system 100 (hereinafter "motion capture system") can include a capture volume 102 where a number of capture entities 106 (e.g., participants) can participate together in a simulated scenario in a virtual environment 118. Further, the capture volume can include a platform that represents a virtual vehicle (or platform of a virtual vehicle) in the virtual environment.

In one embodiment, the capture entity 106, as illustrated in FIG. 1, can be any object in the capture volume 102 that is motion captured into the simulated virtual environment 118 using a motion capture device 104. In one embodiment, the capture entity 106 can be a living being (participant), such as a human being. In another embodiment, the capture entity 106 can be any physical inanimate object (weapon, weapon model, racket, wand, stick, etc) in the capture volume 102. In some embodiments, the capture entity 106 can be both a participant and equipment associated with the participant, such as a weapon held by a participant.

In one embodiment, a motion capture device 104 in the capture volume 102 can capture (quantitatively assess) the movement and/or actions of the capture entity 106 and process it to generate corresponding motion capture data. In some embodiments, a tracking system 408 may process the movement and/or action of the capture entity obtained from the motion capture device 102 to generate the motion capture data. In one embodiment, when the capture entity 106 is a participant, the motion capture data can include, inter alia, a position, an orientation and/or a velocity of movement of the participant's head. When the capture entity 106 includes ammunition and/or a model of the ammunition, the motion capture data can include, inter alia, a position, an orientation and/or a velocity of movement of the ammunition and/or a model of the ammunition. In another embodiment, the motion capture data can include a position, an orientation, and velocity of movement of both the participant's head and the object associated with the participant. The motion capture data of the capture entity 106, along with other capture entity-specific information such as sound and physiological data, can be used by the motion capture system 100 to control the behaviors and/or interactions of participant avatars in the simulated virtual environment 118.

Operation 1 as shown in FIG. 1, illustrates a capture entity 106 (hereinafter 'participant') preparing to participate in a simulation scenario in the virtual environment 118. In one embodiment, to participate in such a simulation, a capture entity 106 such as a participant (e.g., living being) can don a wearable computing device 114. The peripherals of the wearable computing device 114 can include, but are not limited to the HMD 112, a microphone, a set of headphones and/or a computing device capable of transmitting, receiving and/or processing data. Further, the participant can be outfitted with wearable gear (e.g., clothing, equipment, etc). In one embodiment, retro reflective markers 110 and/or other items for tracking the participant's movement in the capture volume 102 may be attached to the wearable gear. In some embodiments, the motion capture system 100 can track the participants even without any markers.

In operation 2, after appropriate preparation (e.g., suiting up), the participant 106 can register with the motion capture system 100. The operation of registering can include creating an avatar for the participant 106 in the virtual environment 118. Further registering as a participant 106 can include establishing an association between the participant's wearable computing device 114 and the participant's avatar 116.

After being registered, the participant 106 is now free to join other participants 106 in the simulated scenario. While in the capture volume 102, the motion capture system 100 can determine the position and actions (e.g., motion data) of the participant 106. In Operation 3, the motion capture system 100 can integrate the participant 106 into the virtual environment 118 by driving the behavior of the participant's avatar in the virtual environment 118 using the motion capture data of the respective participant 106. Further, the participant's avatar's view of the simulated virtual environment can be nearly simultaneously displayed in the participant's HMD 112. Once the participant 106 is integrated into the virtual environment 118, the participant 106 can explore the virtual environment 118 and/or participate in the simulated events in the virtual environment. In one embodiment, upon completion of the simulation scenario, the simulation can be optionally replayed for training or other purposes, as illustrated by operation 4 of FIG. 1. The motion capture system 100 is described in greater detail below, in association with FIG. 2.

Figure 2:
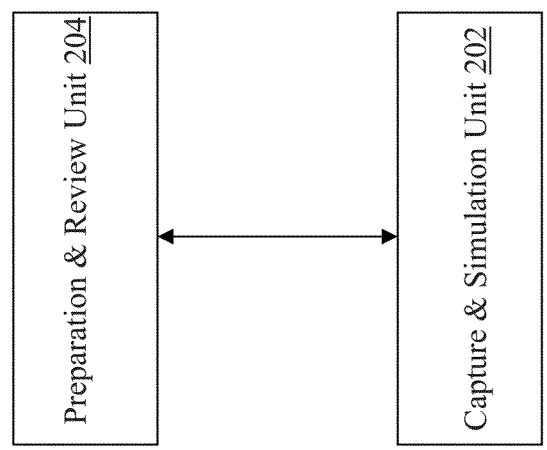
FIG. 2 illustrates a functional block diagram of the motion capture simulation system of FIG. 1, according to certain exemplary embodiments of the present invention.

Referring now to FIG. 1 and FIG. 2, FIG. 2 illustrates a functional block diagram of the motion capture simulation system of FIG. 1, according to certain exemplary embodiments of the present invention. In particular, FIG. 2 illustrates a capture and simulation unit 202 and a preparation and review unit 204.

The capture and simulation unit 202 can be operable to obtain motion capture data associated with participants disposed in the capture volume 102. The motion capture data can be obtained by capturing images and/or video recording the capture volume 102 in which the participants are disposed. The images and/or recordings of the capture volume 102 including the participants can be processed by the capture and simulation unit 202 to extract the motion capture data associated with the participants. Further, the capture and simulation unit 202 can use the motion capture data of each of the participants to drive the avatars of each participant in the virtual environment 118. One of ordinary skill in the art will understand and appreciate that even through capturing images and/or video recording the capture volume are specifically mentioned to obtain the motion capture data, they can be replaced with other tracking modalities without departing from the broader spirit of the invention.

In addition, the capture and simulation unit 202 can be operable to generate sensory feedback signals based on motion capture data and interaction of participant avatars in the virtual environment 118. Further, the capture and simulation unit can transmit the feedback signals to the participants in the capture volume, creating a feedback loop. The feedback loop created by the participant's interaction with the data processed and emanating from the capture and simulation unit 202 provides an immediate and tactile experience drawing the participant into a belief that the experience is real (immersion). In one embodiment, the capture and simulation unit 202, can generate and manage actions of AI characters in the virtual environment 118.

The virtual environment 118 and the simulation scenarios can be generated and managed by the preparation and review unit 204. Further, the preparation and review unit 204 can be operable to prepare participants for taking part in the simulation scenario. As discussed in association with FIG. 1, preparing the participant for the simulation can include, inter alia, registering the participant with the motion capture system 100, associating a participant to a corresponding avatar 116 in the virtual environment 118, associating the participant's wearable computing device 114 to the participant's avatar 116, scaling the participant's avatar to match a physical dimension of the participant in the capture volume 102. The preparation and review unit 204 can store the avatar of each participant and can provide the information that associates the participant to the avatar to the capture and simulation unit 202 for further processing. The preparation and review unit 204 can be operable to load a virtual environment 118 and/or a simulated scenario in the virtual environment 118 when requested by the capture and simulation unit 202. In one embodiment, the capture and simulation unit 202 can be communicatively coupled to the preparation and review unit 204. The capture and simulation unit 202 and the preparation and review unit 204 are described in greater detail below, in association with FIG. 3 and FIG. 4.

Figure 3:
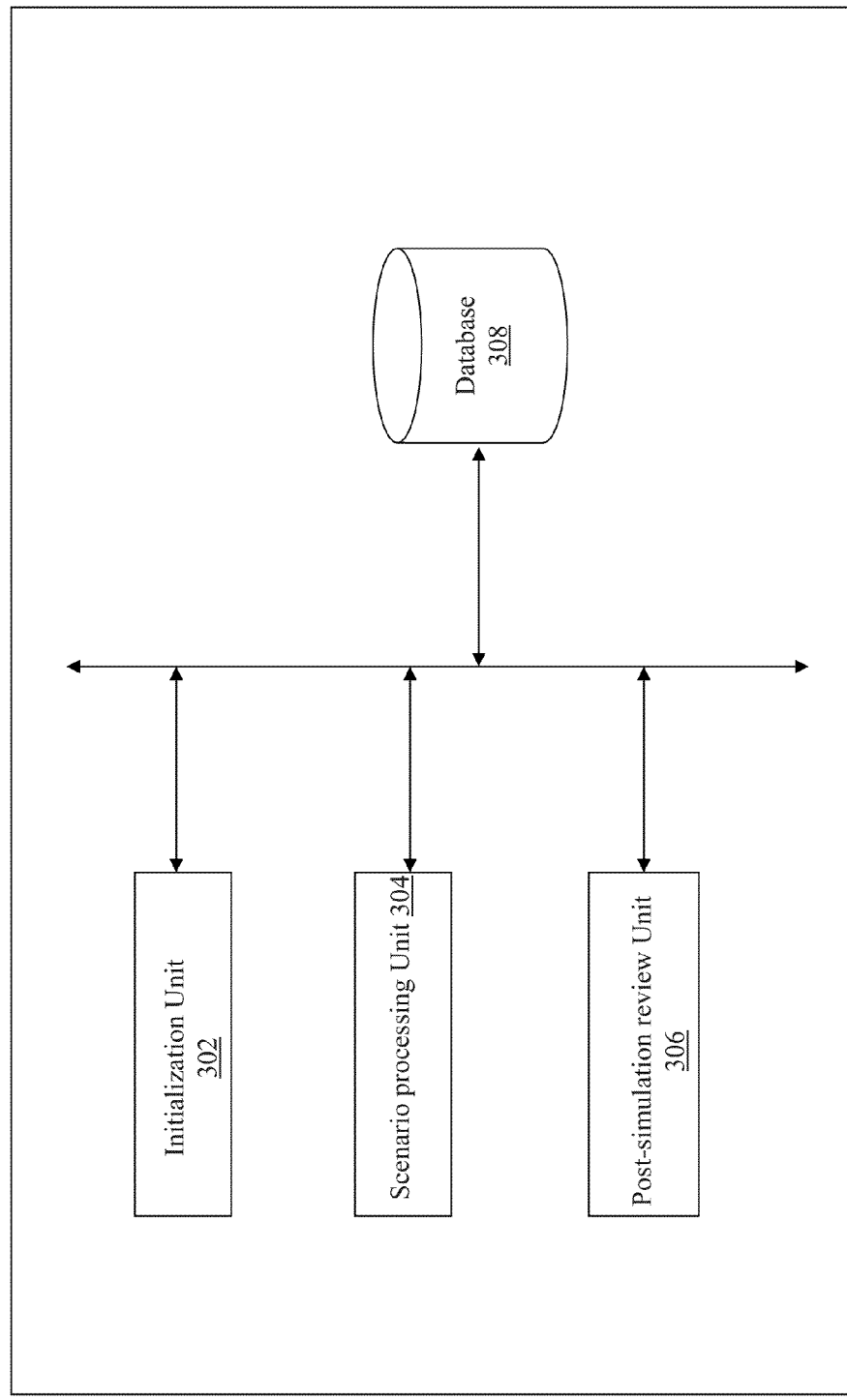
FIG. 3 illustrates a functional block diagram of the preparation and review unit of FIG. 2, according to certain exemplary embodiments of the present invention.

Now referring to FIG. 2 and FIG. 3, FIG. 3 illustrates a functional block diagram of the preparation and review unit of FIG. 2, according to certain exemplary embodiments of the present invention. In particular, FIG. 3 illustrates an initialization unit 302, a scenario processing unit 304, a post simulation review unit 306 and a database 308.

The preparation and review unit 204 can include an initialization unit 302 that can be operable to prepare participants for taking part in the simulation scenario. To prepare the participants for the simulation, the initialization unit 302 can personalize the participant to the motion capture system 100 by first, associating the participant (wearing the wearable gear and/or the wearable computing device 114) with an avatar having the physical dimensions of an average sized human being. The physical dimensions of the average size human being can be predefined. Once the participant is associated with the avatar, the initialization unit 302 can scale the participant's avatar to approximately match the physical dimensions of the participant using position of the markers attached to the wearable gear donned by the participant. Then, the initialization unit 302 can store the relevant participant data, avatar data, scaling data and/or association data between the participant and the avatar in the database 308.

Further, the preparation of review unit 204 can include the scenario processing unit 304. The scenario processing unit 304 can include a data processing device capable of connecting to a distributed network (e.g., Internet). The scenario processing unit 304 can facilitate an operator (not shown in Figure) loading or modifying a virtual environment upon a request from the capture and simulation unit 202. Further, the scenario processing unit 304 can be configured to import a virtual environment from an online source. In addition, the scenario processing unit 304 can store the imported scenarios in the database 308.

In another embodiment, the scenario processing unit 304 may have provisions for an operator to edit appropriate features of the virtual world. The operator may create different routes for the different virtual vehicles in the virtual environment 118. The routes may be different for each mission. In some embodiments, the routes may be predefined. In certain embodiments, the operator may design the route while the simulation is running. Further, the operator can add, remove or modify elements of the virtual world while the simulation is running or after the simulation is completed. The scenario processing unit 304 can include a user interface through which the operator can interact with the scenario processing unit 304.

In the exemplary embodiment of FIG. 3, the processing and review unit 204 can include the post simulation review unit 306. The post simulation review unit 306 can include a data processing device such as a computer, a display device and/or and audio output device. In one embodiment, the capture and simulation unit 202 can store the recorded simulation scenario in the database 308. The operator can play the recorded simulation scenario for post simulation training and/or other purposes. The capture and simulation unit 202 is described in greater detail below, in association with FIG. 4.

Figure 4:
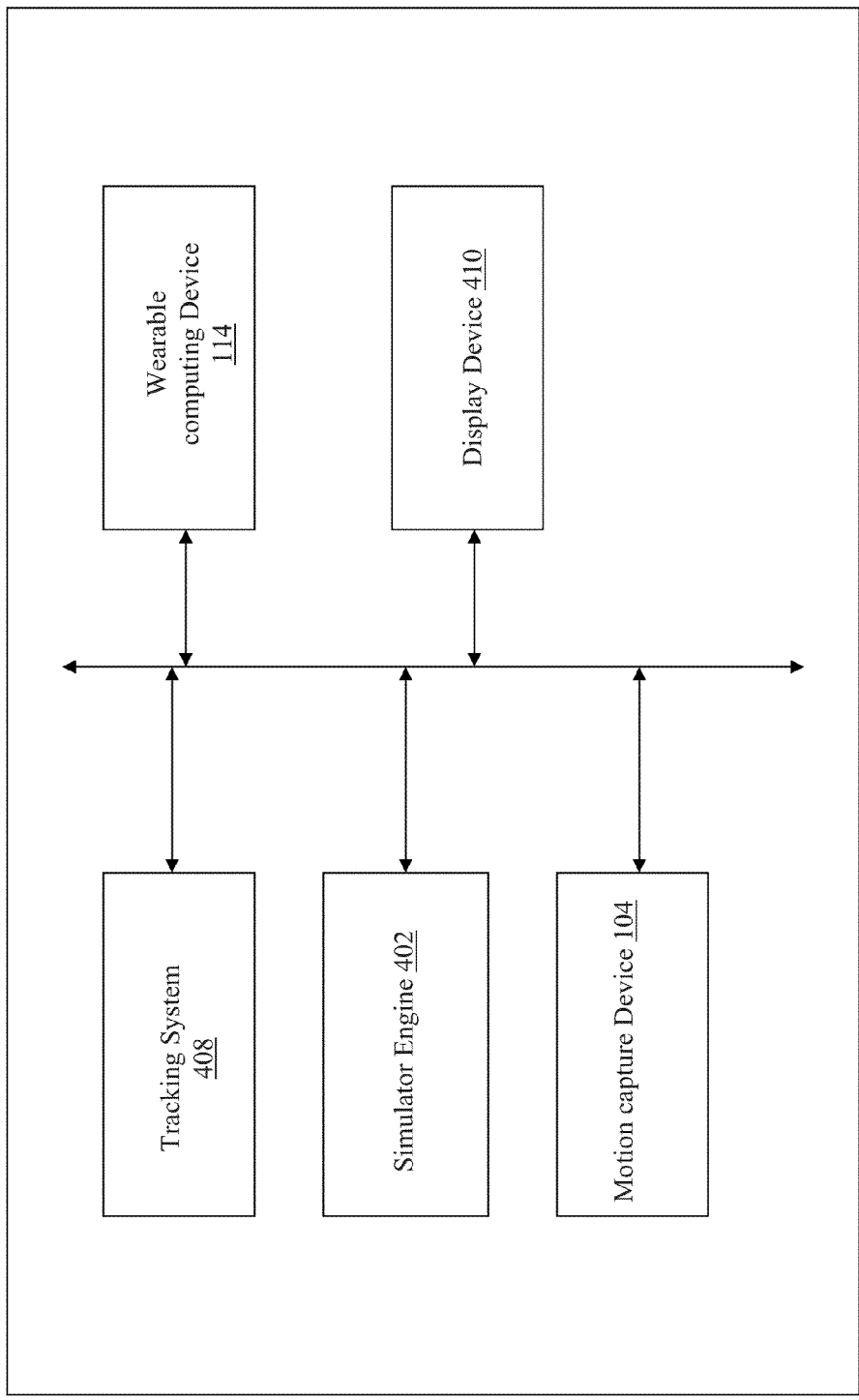
FIG. 4 illustrates a functional block diagram of the capture and simulation unit of FIG. 2, according to certain exemplary embodiments of the present invention.

Now referring to FIG. 2 and FIG. 4, FIG. 4 illustrates a functional block diagram of the capture and simulation unit of FIG. 2, according to certain exemplary embodiments of the present invention. In particular, FIG. 4 illustrates a tracking system 408, a simulator engine 402, a motion capture device 104, a wearable computing device 114, and/or a viewer device 410.

The capture volume 102 can be under surveillance of the simulator engine 402 using a motion capture device 104. The motion capture device 104 can include a high speed camera operable to collect information about the locations of the markers (or the location of the subject in a markerless embodiment) as the participant 106 moves. The motion capture device 104 can support high-speed image capture, as well as high-speed image processing. In some embodiments, the motion capture system 100 can include more than one motion capture device 104. Each motion capture device 104 of the one or more motion capture devices may be connected to each other, as well as to a tracking system 408. The information collected by the motion capture device 104 can include images and/or video of the capture volume 102 and a participant 106 within the capture volume 102.

The information captured using the motion capture device 104 can be forwarded to the tracking system 408. The tracking system 408 can use the captured information from the motion capture device 104 to track and determine a motion of the participant 106 in the capture volume 102. Using the captured information, the tracking system 408 can determine 3D motion data (hereinafter "motion capture data") for each participant 106 in the capture volume. In one embodiment, the tracking system 408 can send the motion capture data (e.g., position, orientation, velocity, etc.) of the participant 106 to the wearable computing device 114 of the participant 106. In another embodiment, the tracking system 408 can send the motion capture data of the participant 106 to the simulator engine 402.

The simulator engine 402 can receive motion capture data from the tracking system 408 and/or in some cases, directly from the motion capture device 104. In addition to the motion capture data, the simulator engine 402 can receive auditory, tactile data, and/or olfactory data. The simulator engine 402 can process the received data to generate a sensory feedback signals for the capture entity 106 (e.g., participant). The simulator engine 402 can transmit the feedback signals, as auditory data, visual data, tactile data and/or olfactory data, to the wearable computing device 114 of the capture entity 106. Further, the simulator engine 402 can transmit a simulation scenario to a display device 410.

The display device 410 can process the video data and/or the simulation scenario to display the simulation to an external user. The display device 410 can include, inter alia a TV, a computer, a monitor, a LCD display, LED display and/or smart display. The display device 410 can display the simulation from different perspectives. The different perspectives may be displayed through a partitioned view over a single display interface such that an external user need not use multiple display devices to view the simulation from each perspective. In an alternate embodiment, the display device can include one or more display interfaces that are connected to each other.

Figure 5:
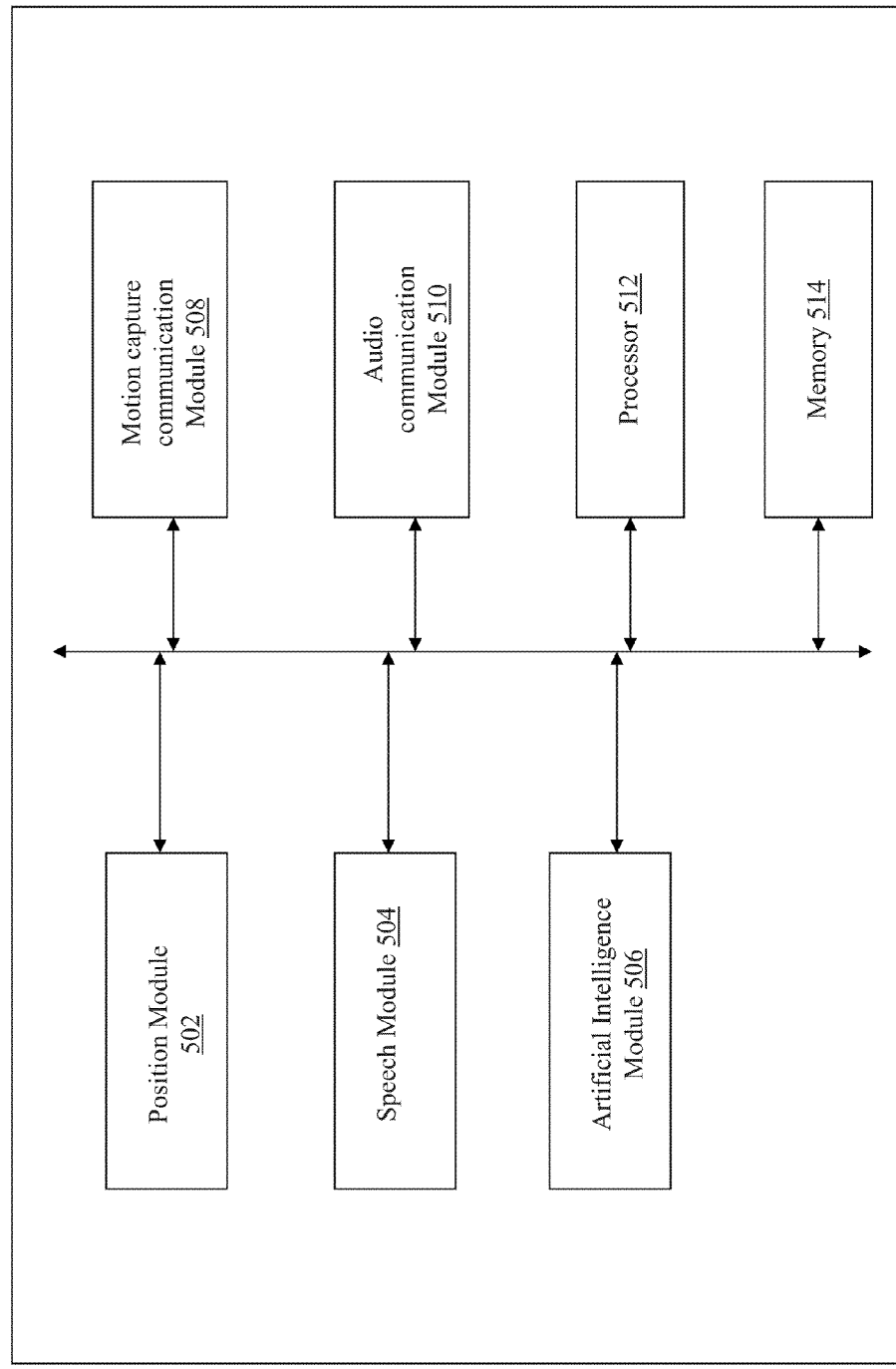
FIG. 5 illustrates a functional block diagram of the simulator engine, according to certain exemplary embodiments of the present invention.

Now referring to FIG. 4 and FIG. 5, FIG. 5 illustrates a functional block diagram of the simulator engine, according to certain exemplary embodiments of the present invention. In particular, FIG. 5 illustrates a motion capture communication module 508, an audio communication module 510, a position module 502, a speech module 504, an artificial intelligence module 506, a processor 512, and a memory 514.

In one embodiment, processor 512 can be a multi-core processor. In another embodiment, the processor 512 can be a combination of multiple single core processors. In one embodiment, the simulator engine 402 can include a memory 514 coupled to the processor 512. The memory 514 may be non-transitory storage medium, in one embodiment. The memory 514 may include instructions. The processor 512 may execute the instructions to perform operations of the simulator engine 402. In other words, operations associated with the different modules of the simulator engine 402 can be executed using the processor 512. In one embodiment, the simulator engine 402 can include one or more data processing devices such as computers mounted on a rack. The simulator engine 402 can include a user interface and an operator may access the simulator engine 402 through the user interface.

In the exemplary embodiment of FIG. 5, the simulator engine 402 can include an audio communication module 510. The audio communication module 510 may be communicatively coupled to the wearable computing device 114. The wearable computing device 114 can transmit an audio signal generated by participant 106 in the capture volume 102. The audio generated by the participants can be captured through a microphone coupled to the participants. Further, the audio communication module 510 can forward the audio signal to the speech module 504.

The speech module 504 can receive the audio signal and process the audio signal to retrieve a recognizable speech corresponding to the audio signal from the participant 106. The speech module 504 can be configured to process various aspects of the audio signal to determine the participant that generated the audio signal as well as the intended recipient of the speech. Further, the speech module 504 can forward the recognizable speech to the artificial intelligence module 506 to perform appropriate operations in the virtual environment 118 corresponding to the recognizable speech (e.g., instructional command from trainer, communication between trainer and trainees, or communication between participants).

In the exemplary embodiment of FIG. 5, the simulator engine 402 includes a motion capture communication module 508. The motion capture communication module 508 can be configured to receive motion capture data associated with the participant 106 from the tracking system 408 and/or the motion capture device 104. In one embodiment, the motion capture communication module 508 may be coupled to a distributed network (not shown in the Figures); to receive motion capture data from remote capture volumes. Upon receiving the motion capture data, the motion capture communication module 508 can forward the received motion capture data to the position module 502.

Using the motion capture data, the position module 502 can determine the position, orientation and/or velocity of motion of the participant 106 in the capture volume 102. The position, orientation and/or velocity of motion of the participant 106 can be used to drive the participant's avatar in the virtual environment 118. Further, using motion capture data the position module 502 can determine if the participant 106 is approaching a boundary of the capture volume 102 by determining if the participant 106 is within a threshold distance of the boundary. Upon determining that the participant is in a threshold distance from the boundary in the capture volume 102, the position module 502 can send a signal to the artificial intelligence module 506.

Responsive to receiving the signal from the position module 502, the artificial intelligence module 506 can determine if the participant 106 has changed directions in the capture volume to avoid being constrained by the impending boundary. Upon determining that the participant 106 has changed directions, the artificial intelligence module 506 can apply transformations to the motion capture data of the participant 106 to cancel the corresponding effects in the virtual environment such that in the virtual environment 118, a direction of movement of the participant's avatar is preserved despite the participant changing directions of movement in the capture volume 102. In one embodiment, the artificial intelligence module 506 can apply transformation algorithms to map a participant 106 in a capture volume 102 to a virtual environment 118. The artificial intelligence module 506 can couple a participant's avatar to a virtual vehicle in the virtual environment by mapping the participant in the capture volume 102 to the virtual vehicle in the virtual environment 118 using various transformation matrices. Further, the artificial intelligence module 506 can load a path of the respective vehicle in the virtual environment and simulate a motion of the vehicle that has the coupled participant's avatar along the loaded path. In addition, the artificial intelligence module 506 can simulate a participant's avatar dismounting the vehicle based on a corresponding action by the participant in the capture volume 102.

Further, the artificial intelligence module 506 can be configured to drive actions of a participant's avatar, and drive the reactions and/or state changes of the AI characters based on the motion capture data associated with the participant. In addition, the artificial intelligence module 506 can generate the sensory signals that are fed back to the participants to provide a sensory immersion experience.

Turning now to FIGS. 6-14, these figures describe the different methods that can be used in a motion capture system 100 to allow a participant to operate in a substantially larger virtual environment while being constrained to a smaller available capture volume in the real world. In an exemplary embodiment, the physical capture volume in which the participant is disposed may be smaller than the virtual environment in which the participant operates. For example, a motion capture volume may be 100×50 feet and the corresponding virtual environment in which the participant operates can range from the size of a warehouse to multiple square miles. First, FIGS. 6-11 describe extending a participant avatar's operational space in the virtual environment using a transportation platform. Then, the remaining FIGS. 12-14 describe extending a participant avatar's operational space in the virtual environment by changing a participant's direction of movement in a capture volume.

Turning to FIG. 6-11, these figures describe a process by which a participant can extend the participant's operational space in the virtual environment by being attached to any appropriate virtual vehicle that can move in the virtual environment. The representation of the virtual vehicle in the capture volume 102 can be of any appropriate level of complexity, extending from a simple wooden platform to an exact cut-away of a floorboard of the virtual vehicle.

In an example embodiment, a global Cartesian coordinate system can be associated with the capture volume 102. Through a preliminary calibration process that involves motion capture of objects of known dimensions, one can develop the equations necessary to associate a particular 3D coordinate with the detection of a common point in any combination of two or more motion capture devices. In one embodiment, the calibration process, by the appropriate determination of known and unknown points, computes the external (for example, camera (x,y,z) position) and internal (for example, camera field-of-view) camera parameters, where in the external parameters are defined with respect to a computed 3-dimensional Cartesian coordinate system. Typically in the Cartesian coordinate system that represents the capture volume 102 the origin of the y-axis can correspond to the floor level of capture volume. The y-axis is taken to be perpendicular to the floor (vertical). Further, the origin of the x-axis and z-axis can be at the center of the area representing the capture volume. In addition, the x-axis and the z-axis may be perpendicular and parallel to the floor and perpendicular to one another creating a right-handed system.

Once the Cartesian coordinate system is defined, the participant's real-world position and orientation in the capture volume 102 can be defined with respect to the Cartesian coordinate system. The position and orientation of the participant 106 may be provided by the computed (motion-captured) position of the origin of the participant's root body, the waist, and the orientation of the said root body. In response to determining the position and orientation of the participant 106, the participant's local frame can be transformed to the motion-capture Cartesian coordinate frame using a first 4×4 transformation. The first 4×4 transformation may be represented as $T_S$. Once the participant's local frame is transformed to the Cartesian coordinate frame, a second 4×4 transformation can be applied to map the participant 106 from the Cartesian coordinate system into a virtual environment 118 coordinate system. The second 4×4 transformation may be represented as $T_C$. In an example embodiment, the transformation $T_C$ can contain any appropriate arbitrary translation and rotation about any or all of the 3 axes, depending on a desired operational position and orientation in the virtual world. The transformations $T_S$ and $T_C$ may be 4×4 matrices. The participant's position and orientation in the virtual world, $T_V$, may be defined by Equation 1 as follows:

$$T_V = T_C T_S \qquad \text{Equation 1}$$

In other words $T_S$ may represent the transformation (determined by motion capture data) of the participant into the capture volume 102, and $T_C$ may refer to an arbitrary transformation of the capture volume into the virtual world.

The participant's avatar 116 can be moved throughout the virtual environment 118 based on the movement of the participant 106 in the capture volume 102 (which in turn modifies the transformation $T_S$) and by also manipulating the transformation $T_C$. FIGS. 6-14 describe the generation of transformation $T_C$ to extend the participant avatar's operational space in the virtual environment 118 despite of the participant's operational space being constrained by the boundaries of the capture volume 102.

Extending an Operational Environment in the Virtual World Using a Vehicle

Figure 6:
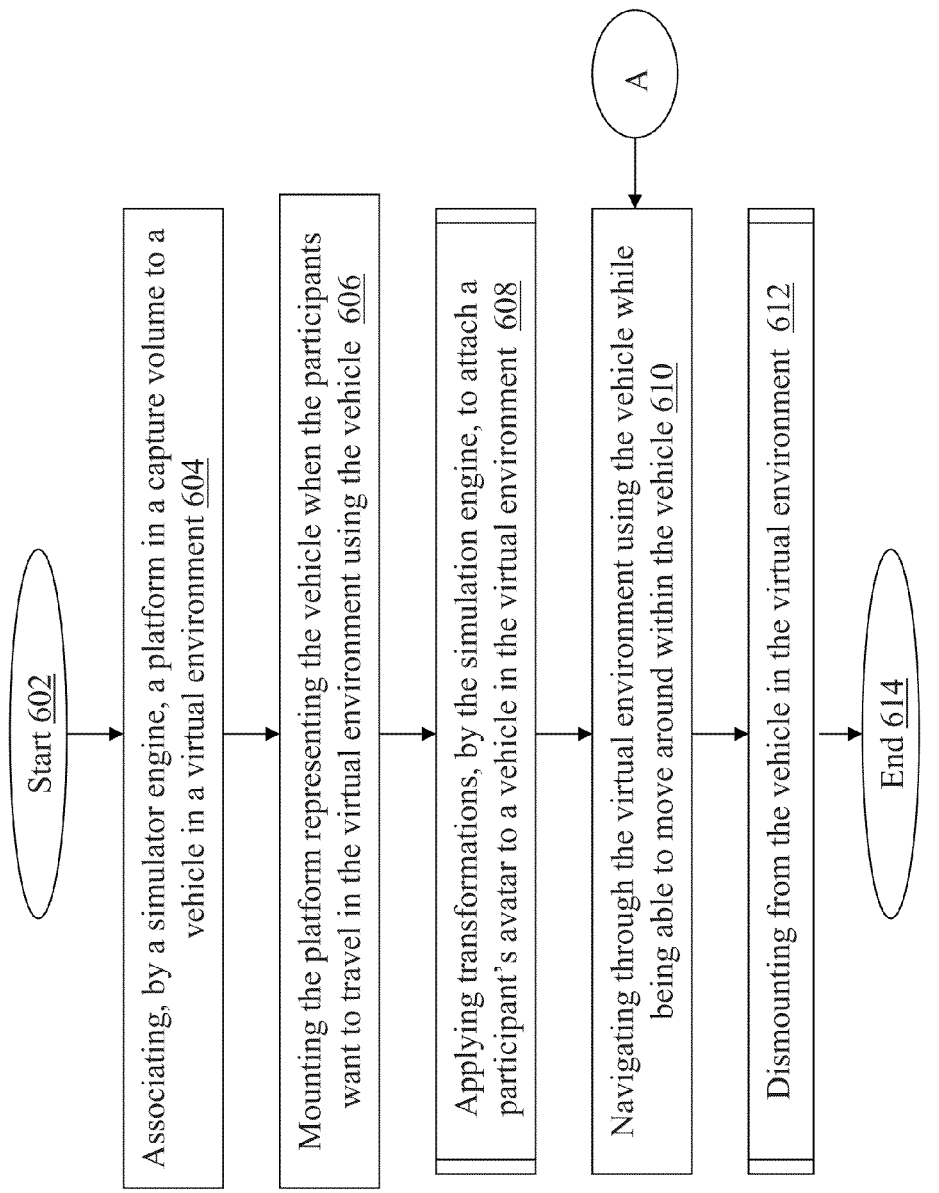
FIG. 6 is a flow chart that illustrates a process of extending a participant avatar's operational space in the virtual environment using a transportation platform, according to certain exemplary embodiments.

Turning now to FIG. 6, this figure is a flow chart that illustrates a process of extending a participant avatar's operational space in the virtual environment using a transportation platform, according to certain exemplary embodiments. The process may begin with operation 602 and proceed to operation 604. In operation 604, the simulator engine 402 can associate the platform 802 (shown in FIG. 8) in the capture volume 102 to a virtual vehicle in the virtual environment 118. In some embodiments, operation 604 may be performed as a part of the initialization process that is described in FIG. 3. Once the platform 802 in the capture volume 102 is associated with the virtual vehicle in the virtual environment 118, the participant's avatar 116 can mount a vehicle based on the participant mounting the platform 802 in the capture volume 102. In operation 606, the participant can mount the platform 802. In response to the participant 106 mounting the platform 802, the simulator engine 402 can mount participant's avatar 116 on the virtual vehicle in the virtual environment 118.

In operation 608, when the participant mounts the platform 802 in the capture volume, the simulator engine 402 can apply a transformation to the motion capture data of the participant to mount the participant's avatar on the vehicle in the virtual environment 118. The transformation applied to the motion capture data of the participant in the capture volume 102 can attach the participant's avatar 116 to the vehicle in the virtual environment 118. Operation 608 will be explained in further detail below, in association with FIG. 7.

Figure 7:
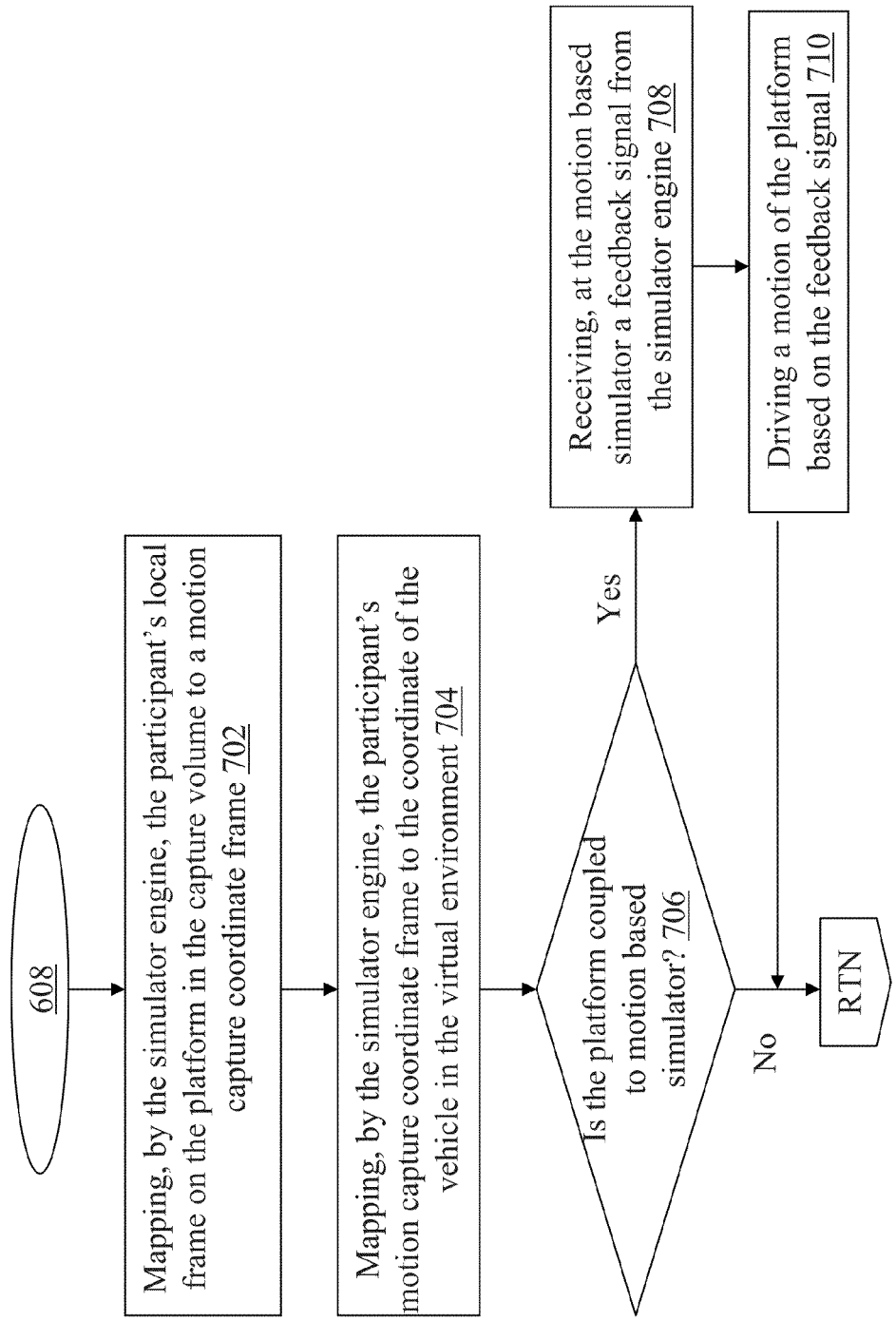
FIG. 7 is a flow chart that illustrates the process of applying a transformation to the motion capture data of a participant to attach the participant's avatar to a vehicle in the virtual environment, according to certain exemplary embodiments of the present invention.

Turning now to FIG. 7, this figure is a flow chart that illustrates the process of applying a transformation to the motion capture data of a participant to attach the participant's avatar to a vehicle in the virtual environment, according to certain exemplary embodiments of the present invention.

The process begins with operation 702 where the simulator engine 402 may apply a first transformation to the motion capture data of the participant 106 on the platform 802 in the capture volume 102. The first transformation can map a local frame of the participant 106 on the platform 802 in the capture volume 102 to the motion capture Cartesian coordinate frame. Once the participant's local frame has been mapped to the Cartesian coordinate frame, a second transformation may be applied in operation 704. The second transformation can map the participant from the Cartesian coordinate frame to a coordinate frame of the virtual environment. In other words, using the second transformation the participant 106 can be mapped from the motion capture system (e.g., Cartesian coordinate frame) to the virtual environment 118.

Using the first and the second transformations, the participant's avatar 116 may be coupled to the virtual vehicle in the virtual environment 118 when the participant 106 mounts the platform 802 in the capture volume 102. For example, the participant 106 may mount the platform 802 in the capture volume 102 and correspondingly the participant's avatar 116 may be mounted onto the floorboard of an airplane or a bus by applying the first and second transformations. Further, once the participant's avatar 116 is coupled to the platform of the virtual vehicle in the virtual environment 118, the participant's avatar 116 can be moved around within the virtual vehicle based on a movement of the participant 106 on the platform 802 in the capture volume 102. For example, if the participant's avatar 116 is coupled to a floorboard of an airplane in the virtual environment 118, then the participant's avatar 116 can be moved in any direction on the floorboard based on a movement of the participant 106 on the platform 802 in the capture volume 102. If the participant 106 moves forward on the platform 802 in the capture volume 102, the participant's avatar 116 can be moved forward on the floorboard of the airplane.

In the case of a participant being attached to a platform, the second transformation $T_C$ represents the transformation (movement) of the virtual vehicle platform in the virtual environment, therefore $T_C*T_S$ will move the subject through the virtual environment attached to the said virtual vehicle platform, where his movements in the capture volume ($T_S$) on the platform 802 will then appear relative to the virtual vehicle platform in the virtual environment.

Further, once the participant's avatar 116 is coupled to the platform of the virtual vehicle in the virtual environment 118, the process proceeds from operation 704 to operation 706. In operation 706, the simulator engine 402 can determine if the platform is coupled to a motion based simulator 1102 (shown in FIG. 11).

In one example embodiment, if the platform is coupled to a motion based simulator 1102, then the process proceeds from operation 706 to operation 708. In operation 708, the simulator engine 402 can generate a feedback signal representing the motion attributes experienced by the vehicle in the virtual environment 118. Further, in operation 708 the simulator engine 402 can transmit the feedback signal to the platform coupled to the motion based simulator. In operation 710, the simulator engine 402 can drive the motion based simulator to control a roll, pitch and yaw of the platform coupled to the motion based simulator 1102 based on the feedback signal.

Alternatively, in another example embodiment, if the platform is coupled to a motion based simulator 1102, a position and orientation of the platform coupled to the motion based simulator 1102 can be used to orient the platform of the virtual vehicle in the virtual environment 118.

If the platform is not coupled to a motion based simulator, then the process returns to operation 610.

Referring back to FIG. 6, once the participant's avatar is coupled to the platform of the virtual vehicle in the virtual environment 118, the simulator engine 402 can initiate a motion of the virtual vehicle (hereinafter 'vehicle') in the virtual environment 118. In other words, once the participant's avatar is coupled to the virtual vehicle, the simulator engine may move the virtual vehicle through the virtual environment along with the coupled avatar while the person is mounted on the structure in the capture volume.

In one example embodiment, the virtual vehicle may be moved through the virtual environment along with the coupled avatar in response to an input from the person (mounted participant). In another example embodiment, the virtual vehicle may be moved through the virtual environment along with the coupled avatar in response to the person mounting the structure in the capture volume. In yet another example embodiment, the virtual vehicle may be moved through the virtual environment based on a simulation scenario. The simulation scenario may be predefined or may be created while the simulation is running.

In one embodiment, if the virtual vehicle is moved through the virtual environment, the capture volume may be mapped to a first geographic region of the virtual environment 118 when the person mounts the platform in the capture volume 102 and the capture volume is mapped to a second geographic region of the virtual environment 118 when the person dismounts the structure in the capture volume. Further, while the virtual vehicle is moved through the virtual environment 118 along with the coupled avatar, the simulator engine may present a changing landscape of the virtual environment 118 that is representative of moving through the virtual environment 118, to a head mounted display (HMD 112) of the participant as the virtual vehicle moves through the virtual environment 118.

Each vehicle may be associated with a number of routes. The routes associated with the vehicle can be pre-defined or created while the simulation is running. In some embodiment, an operator can choose the route that has to be executed by the vehicle in the virtual environment 118. For example, using a helicopter in the virtual environment 118, the participant's avatar can be flown from one location to another location in the virtual environment 118. While the helicopter is in flight, the participant's avatar 116 can move around within the helicopter based on a movement of the participant 106 on the platform 802 (or platform 1102 coupled to the motion based simulator) in the capture volume 102. Coupling a participant's avatar 116 to the vehicle in virtual environment 118 and moving the participant's avatar 116 using the vehicle will be described using exemplary illustrations, in association with FIGS. 8 and 11.

Figure 8:
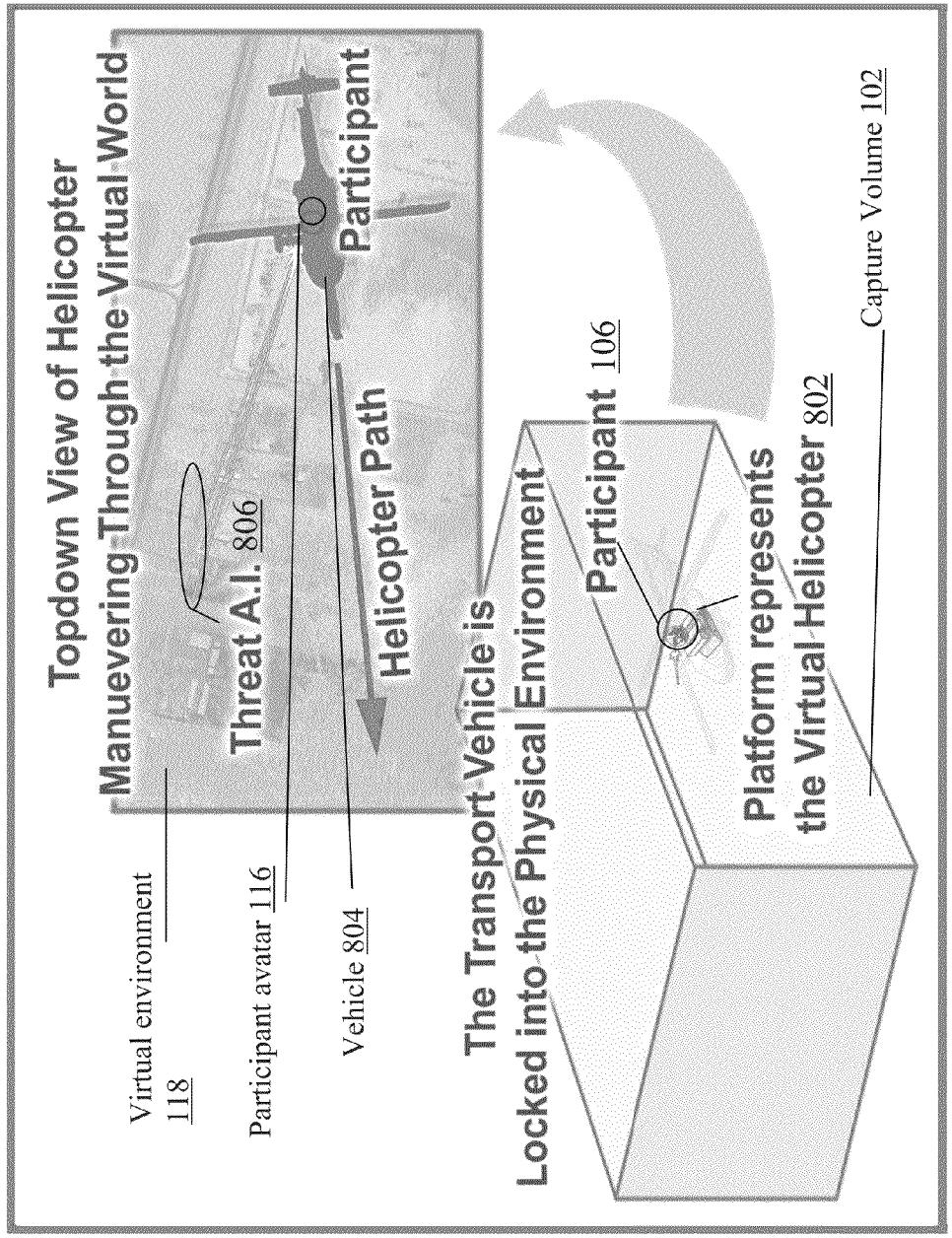
FIG. 8 illustrates a participant's avatar coupled to a vehicle in the virtual environment based on a participant mounted on a platform in the capture volume, according to certain exemplary embodiments of the present invention.

Turning to FIG. 8, this figure illustrates an example of a participant's avatar coupled to a vehicle in the virtual environment based on a participant mounted on a platform in the capture volume, according to certain exemplary embodiments of the present invention.

FIG. 8 illustrates a platform 802 in the capture volume 102. The position and orientation of the platform 802 in the capture volume 102 may be fixed. In other words, the platform 802 in the capture volume 102 may be stationary. However, the vehicle in the virtual environment 118 that corresponds to the platform 802 may be mobile. The movement of the vehicle platform in the virtual environment 118 can be defined by a time-dependent data stream that iteratively (or continuously) maps the platform 802 into the virtual environment 118. The data stream can be generated from different methods such as a local platform 802 and/or remote platform simulation or an animation data file.

The said data stream may refer to the virtual vehicle's (e.g., platform of the virtual vehicle) position and orientation with respect to time. In one embodiment, if the platform 802 in the capture volume 102 is a motion based platform (i.e., platform coupled to a motion based simulator 1102) then, in real-time, the simulator engine 402 can receive from the motion based simulator, data that can drive the virtual vehicle's orientation with respect to time as the simulation is running. In another embodiment, the remote platform simulation may refer to a remote simulation of a vehicle, whose position & orientation are provided continuously to the current simulation. Further, the animation data file may refer to position and orientation data that can be generated by various graphic tools (e.g., 3D StudioMax) that provide the capability of 'animating' the path of platforms from position and orientation data provided at specified waypoints (locations) by the operator. This data may then be replayed in the simulation.

The participant's avatar 116 can be coupled to the platform of the vehicle 804 in the virtual environment 118 by iteratively (or continuously) mapping the participant's capture volume Cartesian coordinate space into the virtual environment 118 via mapping the platform to the virtual environment. Mapping the platform to the virtual environment may be represented by Equation 1 as shown in the foregoing paragraphs.

Further, as the participant moves within the capture volume 102, in the virtual environment the participant's avatar 116 can move in the virtual vehicle 804. While within the confines of the vehicle 804, the participant's movement along the surface of the capture-volume can be transformed to an analogous movement of the participant's avatar 116 along the platform of the vehicle 804 in the virtual environment 118. The participant's avatar 116 can move to any position in the virtual world by virtue of the ability of the vehicle to move throughout the virtual environment 118 as depicted in FIG. 8.

Figure 11:
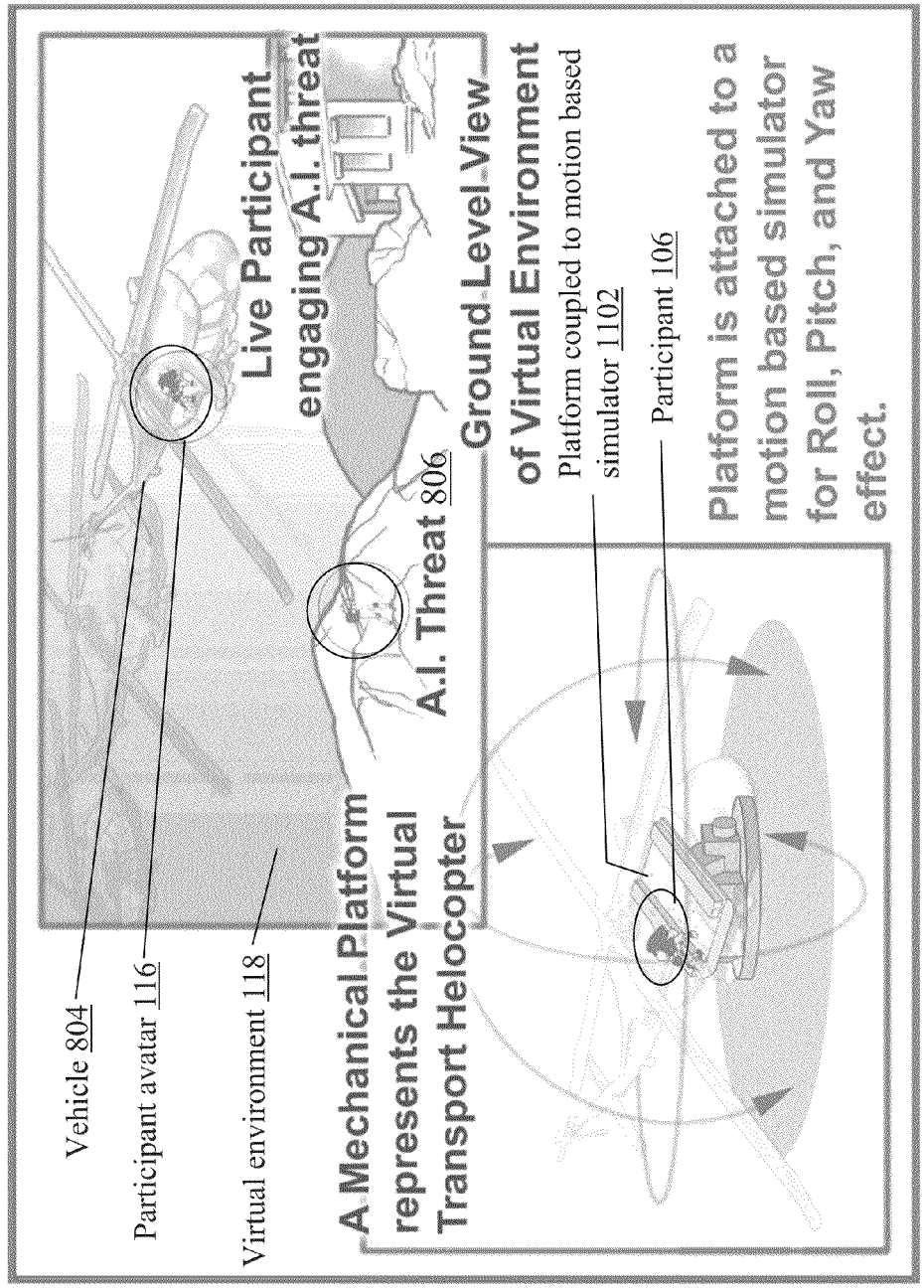
FIG. 11 illustrates a participant's avatar coupled to a vehicle in the virtual environment based on a participant mounted on a platform coupled to a motion based simulator in the capture volume, according to certain exemplary embodiments of the present invention.

Turning to FIG. 11, this figure illustrates an example of a participant's avatar coupled to a vehicle in the virtual environment based on a participant mounted on a platform coupled to a motion based simulator in the capture volume, according to certain exemplary embodiments of the present invention.

In particular FIG. 11 illustrates the platform coupled to a motion-based simulator 1102 in the capture volume 102. As discussed in FIG. 7, in one embodiment, the orientation of the vehicle platform in the virtual environment 118 can be derived from the pitch, roll and yaw of the platform coupled to the motion based simulator 1102 in the capture volume. In this case the participant 106 senses the pitch, roll and yaw of the platform both visually and tactilely, thus giving a more complete immersive experience. In some embodiments, other appropriate devices may be disposed in the capture volume to provide, in the capture volume, certain effects of the movement vehicle in the virtual environment to enhance an sensory immersion the participant. For example, a powerful fan could be placed in the capture volume to create a feeling like a vehicle moving through air (or wind blowing against the participant as avatar rides a motorcycle in the virtual environment) even through the platform 802 (or 1102) may be fixed in the capture volume 102.

In an example embodiment, when the participant 106 is mounted on a platform coupled to the motion based simulator 1102, the first transformation can be derived from the motion capture data of the participant 106. Further, the first transformation can include not only the participant's relative motion, e.g. bending over, but also the changing orientation of the platform coupled to the motion based simulator 1102. The second transformation can map the platform 1102 into the virtual environment 118. Further, the second transformation can be a complete description of the motion of the vehicle platform in the virtual environment 118. As discussed in FIG. 7, using the first and second transformations, the participant's avatar 116 can be coupled to the vehicle in the virtual environment 118 based on motion capture data of the participant 106 when the participant 106 mounts the platform 1102 (or platform 802) in the capture volume.

Referring back to FIG. 6, the participant's avatar can be dismounted from the vehicle in the virtual environment 118 based on the participant dismounting from the platform 802 (or platform 1102) in the capture volume 102. In operation 612, the participant's avatar can be dismounted from the vehicle in the virtual environment. Operation 612 will be discussed in greater detail in association with FIGS. 9 and 10.

Figure 9:
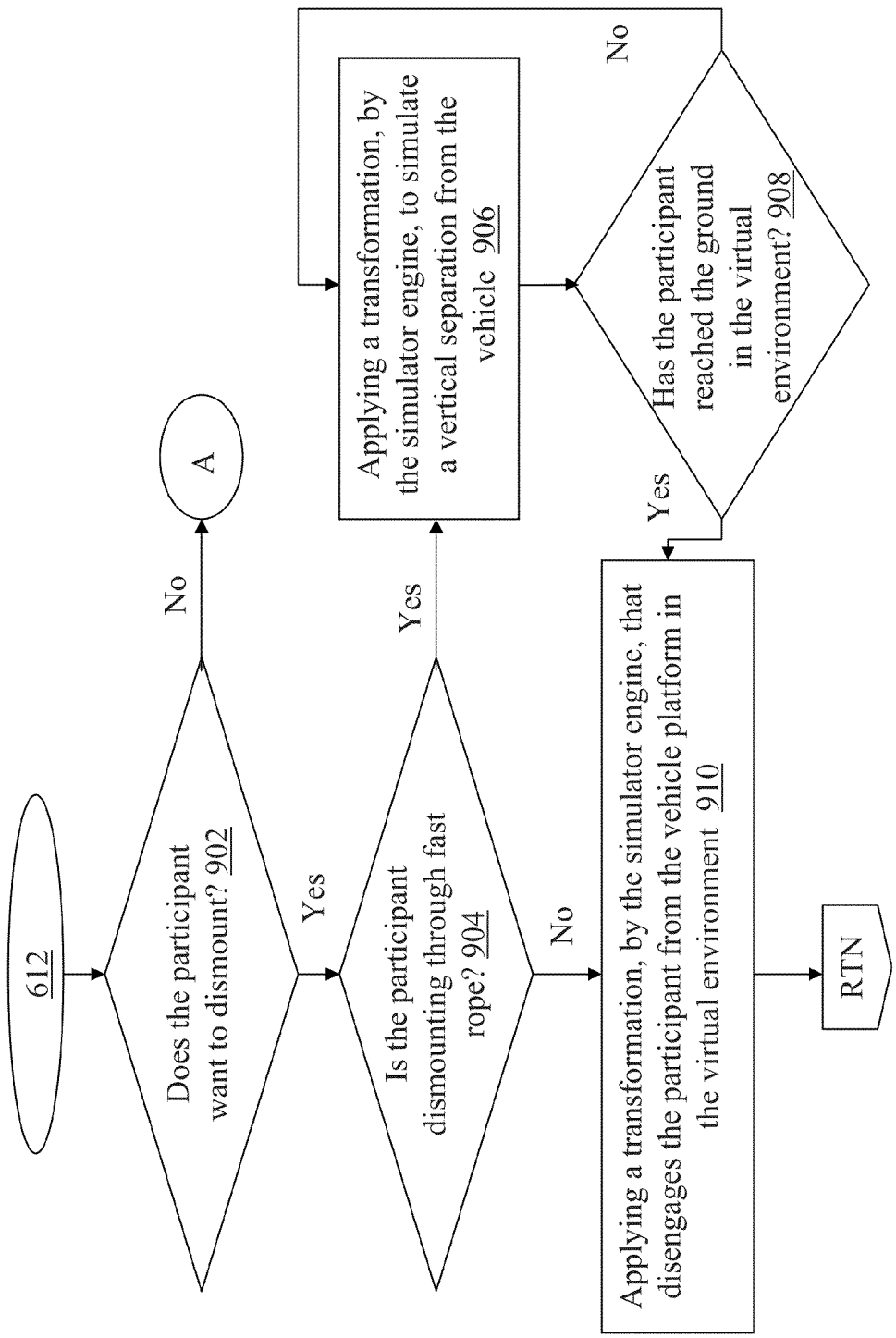
FIG. 9 is a flow chart that illustrates a process of dismounting the participant's avatar from a vehicle in the virtual environment based on the participant dismounting the platform in the capture volume, according to certain exemplary embodiments of the present invention.

Turning to FIG. 9, this figure is a flow chart that illustrates a process of dismounting the participant's avatar from a vehicle in the virtual environment based on the participant dismounting the platform in the capture volume, according to certain exemplary embodiments of the present invention.

The process begins with operation 902. In operation 902, the simulator engine 402 can determine if a participant 106 dismounts the platform 802 (or 1102) in the capture volume. This then drives the participant's avatar 116 to dismount the vehicle in the virtual environment 118. If the simulator engine 402 determines that the participant is dismounting the platform 802 (or 1102), then the process proceeds from operation 902 to operation 904. The participant's avatar 116 in the virtual environment 118 can dismount the vehicle through different methods. Some of the methods to dismount a vehicle can include, inter alia, fast-roping from a parachute, jumping from an airplane using a parachute, or opening a door and getting down from a vehicle. In some embodiments, the different methods to dismount a vehicle in the virtual environment 118 can be based on the type of vehicle that the participant's avatar is mounted on in the virtual environment 118.

In operation 904, the simulator engine 402 can determine a method chosen to dismount the vehicle in the virtual environment. In an example embodiment, the simulator engine 402 can determine if fast-roping is the method chosen for dismounting the vehicle. In response to a positive determination that fast-roping is the method chosen to dismount the vehicle, the simulator engine 402 can proceed to operation 906. In operation 906, the simulator engine 402 can apply a third transformation on top of the first and second transformation to dismount the participant's avatar 116 from the vehicle. The first and second transformations couple the participant's avatar to the vehicle in the virtual environment 118 and the third transformation simulates a vertical separation from the vehicle as the participant's avatar fast-ropes from the vehicle in the virtual environment 118. In an example embodiment, the simulator engine can present a changing landscape representative of the vertical separation in the virtual environment to a HMD 112 of the participant while dismounting using a fast-roping mechanism.

In operation 908, while the participant's avatar is dismounting from the vehicle, the simulator engine 402 can determine if the participant's avatar has reached the ground responsive to dismounting from the vehicle. In response to a positive determination the participant's avatar 116 has reached the ground in the virtual environment 118, the simulator engine 402 proceeds to operation 910.

Further, in operation 904 if the simulator engine determines that fast-roping is not the method chosen for dismounting, the simulator engine proceeds to operation 910. In operation 910, the simulator engine 402 can apply a transformation that disengages (or detaches) the participant's avatar 116 from the vehicle. Further, the participant's avatar 116 can be disengaged or detached from a motion of the vehicle responsive to determining that the participant's avatar has dismounted the vehicle and reached the ground in the virtual environment 118. The participant's avatar 116 may be dismounted from the vehicle based on the participant 106 dismounting the platform 802 (or 1102) in the capture volume. Once the participant's avatar 116 is dismounted from the vehicle, the simulator engine 402 can return to operation 614. Dismounting a participant's avatar 116 from a vehicle in the virtual environment will be described using exemplary illustrations, in association with FIG. 10.

Figure 10:
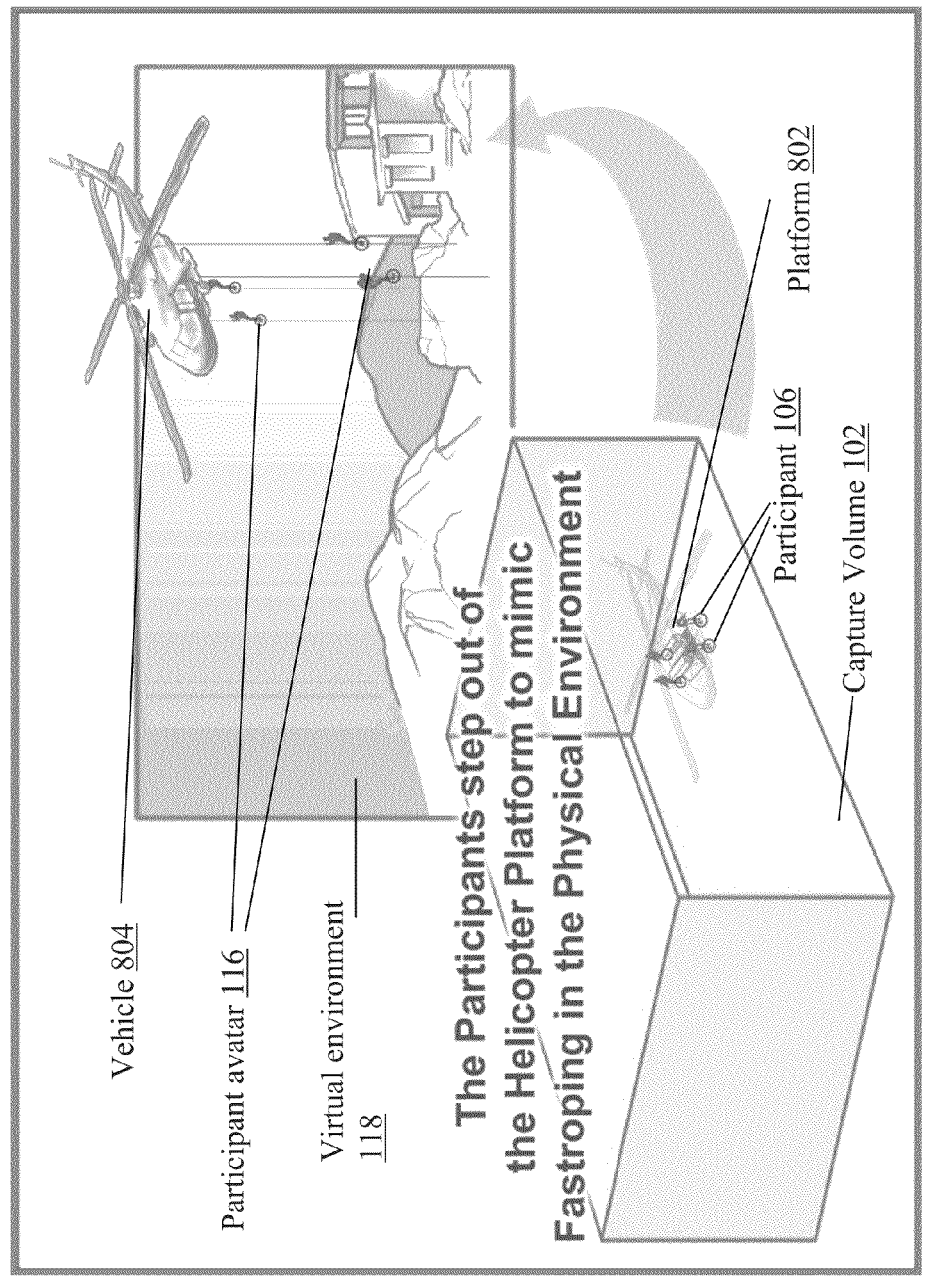
FIG. 10 illustrates a participant's avatar dismounting a vehicle based on the participant dismounting a platform in the capture volume, according to certain exemplary embodiments of the present invention.

Turning to FIG. 10, this figure illustrates an example of a participant's avatar dismounting a vehicle based on the participant dismounting a platform in the capture volume, according to certain exemplary embodiments of the present invention. In particular FIG. 10 illustrates a participant's avatar 116 dismounting a helicopter in the virtual environment by a fast-roping mechanism. One of ordinary skill in the art will appreciate and understand that dismounting using a fast-roping mechanism can be replaced by any other appropriate mechanism of dismounting a vehicle without departing from the broader spirit of the invention.

When the participant 106 dismounts from the platform 802 (or 1102) in the capture volume 102, simultaneously the participant's avatar 116 can be dismounted from the vehicle in the virtual environment 118. The simulator engine 402 can apply a transformation to the participant's motion capture data to dismount the participant's avatar 116 from the vehicle in the virtual environment 118. Once the participant's avatar 116 is dismounted from the vehicle i.e. when the participant reaches the ground, the participant's avatar 116 is no longer affected by any future motion of the vehicle in the virtual environment 118. In other words, if the vehicle maneuvers to the next location, the participant's avatar 116 stays behind. This type of dismount may be like the participant's avatar 116 is stepping off of a landed and currently stationary vehicle in the virtual environment.

The example embodiment of FIG. 10 illustrates a case of simulated dismount, e.g., fast-roping, while the helicopter 804 is still in flight. The simulated dismount can be accomplished by first determining a trigger, possibly a command from the simulation operator or participant, at which time the fast-rope can begin. At this time the participant 106 dismounts from the platform 802 in the capture volume 102, and by feedback signals from the simulator engine the participant 106 experiences the translational movement of the helicopter in the virtual environment 118. The vertical position can be adjusted to simulate a typical fast-rope decent to the ground.

As described in the foregoing paragraphs associated with FIG. 9, the simulator engine 402 can apply a third transformation along with the first two transformations to execute the simulated dismount in the virtual environment 118. The third transformation can simulate the vertical separation of the participant's avatar from the vehicle and also soften the pitch and roll movement of the vehicle (e.g., helicopter) as the participant's avatar 116 fast-ropes to the ground in the virtual environment 118. When the participant's avatar 116 reaches the ground, the third transformation disengages the participant's avatar from the vehicle, i.e., the participant's avatar 116 is no longer affected by any future motion of the vehicle in the virtual environment 118.

In an embodiment where the platform 802 is stationary, the pitch, roll and yaw motion of the vehicle in the virtual environment 118 can be sensed by the participant 106 in the capture volume 102 by changing the participant's view of the virtual environment, as seen through the head mounted display, i.e., HMD 112. In another embodiment where the platform is coupled to a motion based simulator 1102, the movement of the vehicle in the virtual environment 118 can be sensed by the participant 106 in the capture volume 102 by simultaneously moving i.e., changing the pitch an roll of the platform using the motion based simulator 1102 based on a feedback signal from the simulator engine 402.

Referring back to FIG. 9, once the participant's avatar 116 is dismounted based on a dismounting of the participant 106 from the platform in the capture volume, the process returns to operation 614. Referring back to FIG. 6, the process of extending a participant avatar's operational space in the virtual environment using a transportation platform ends in operation 614.

Figure 12A:
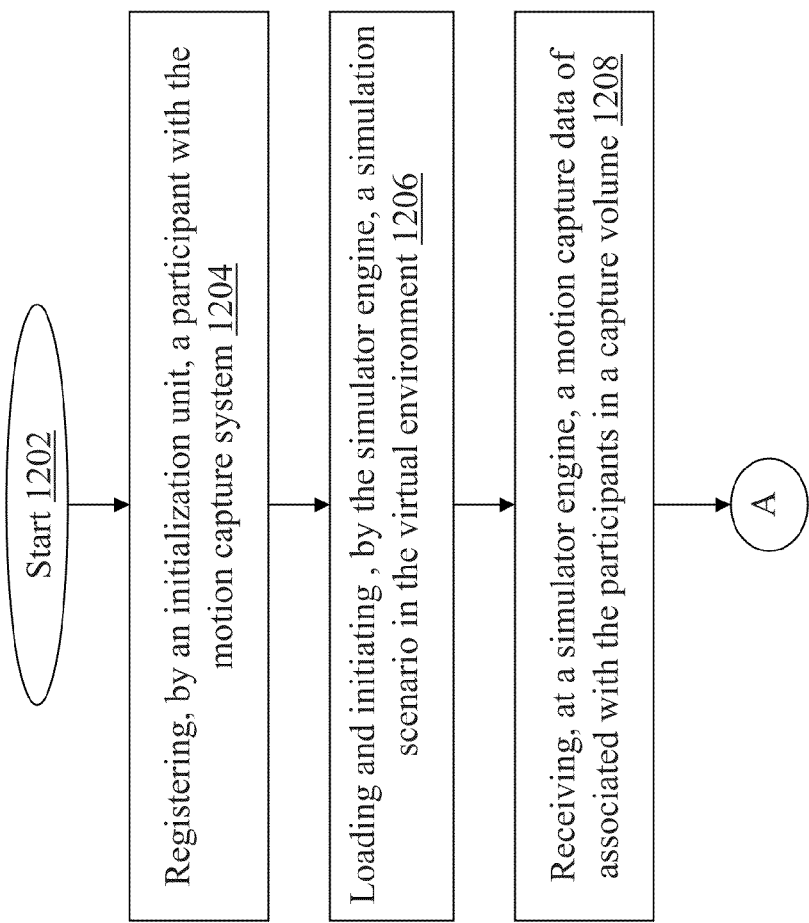
FIGS. 12A-12C (collectively 'FIG. 12') is a flow chart that illustrates a process of extending a participant avatar's operational space in the virtual environment by changing a participant's direction of movement in a capture volume, according to certain exemplary embodiments.
Figure 12B:
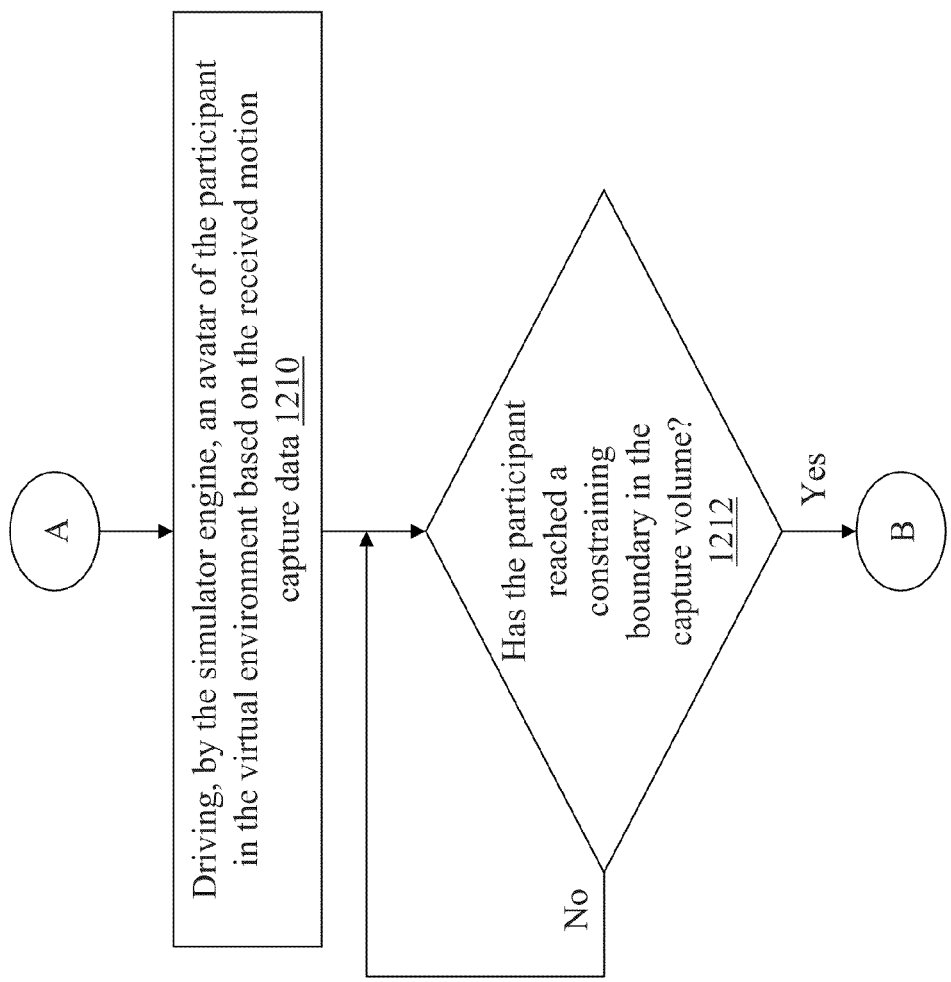
Figure 12C:
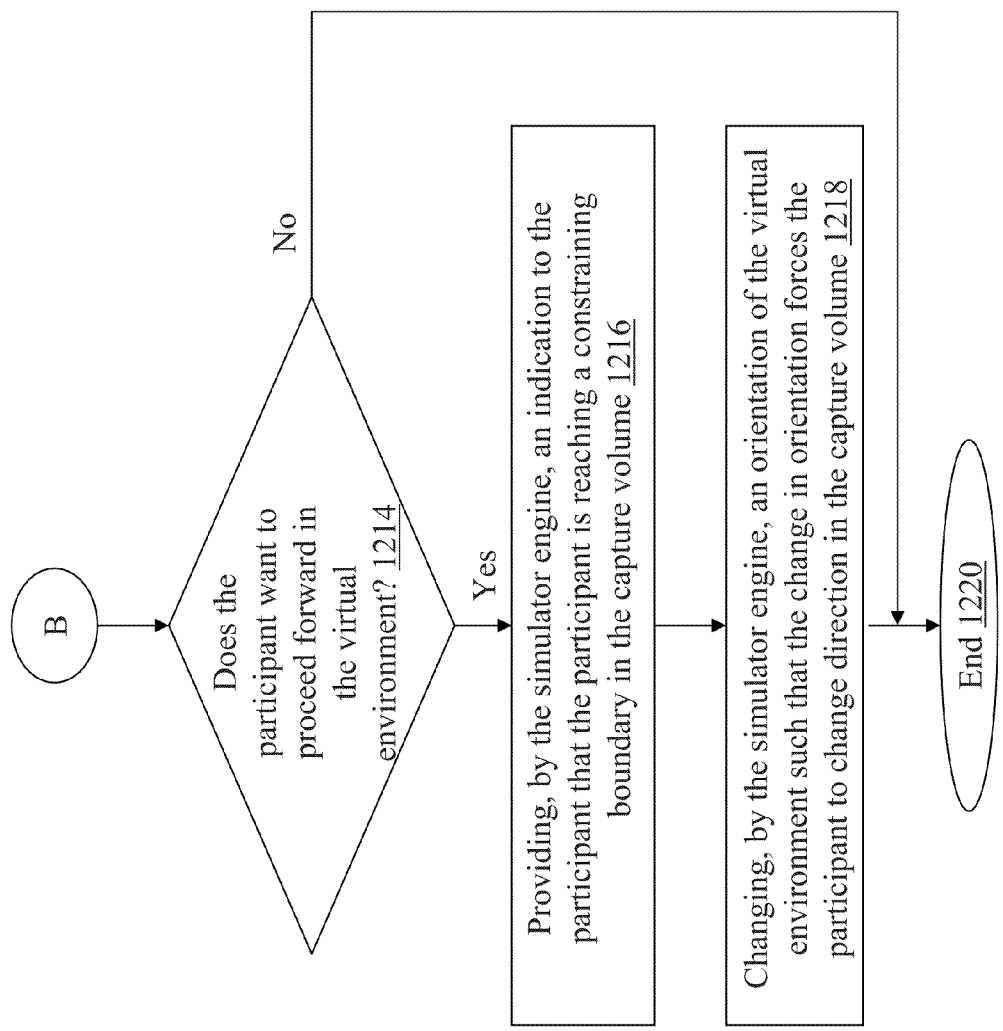
Figure 13:
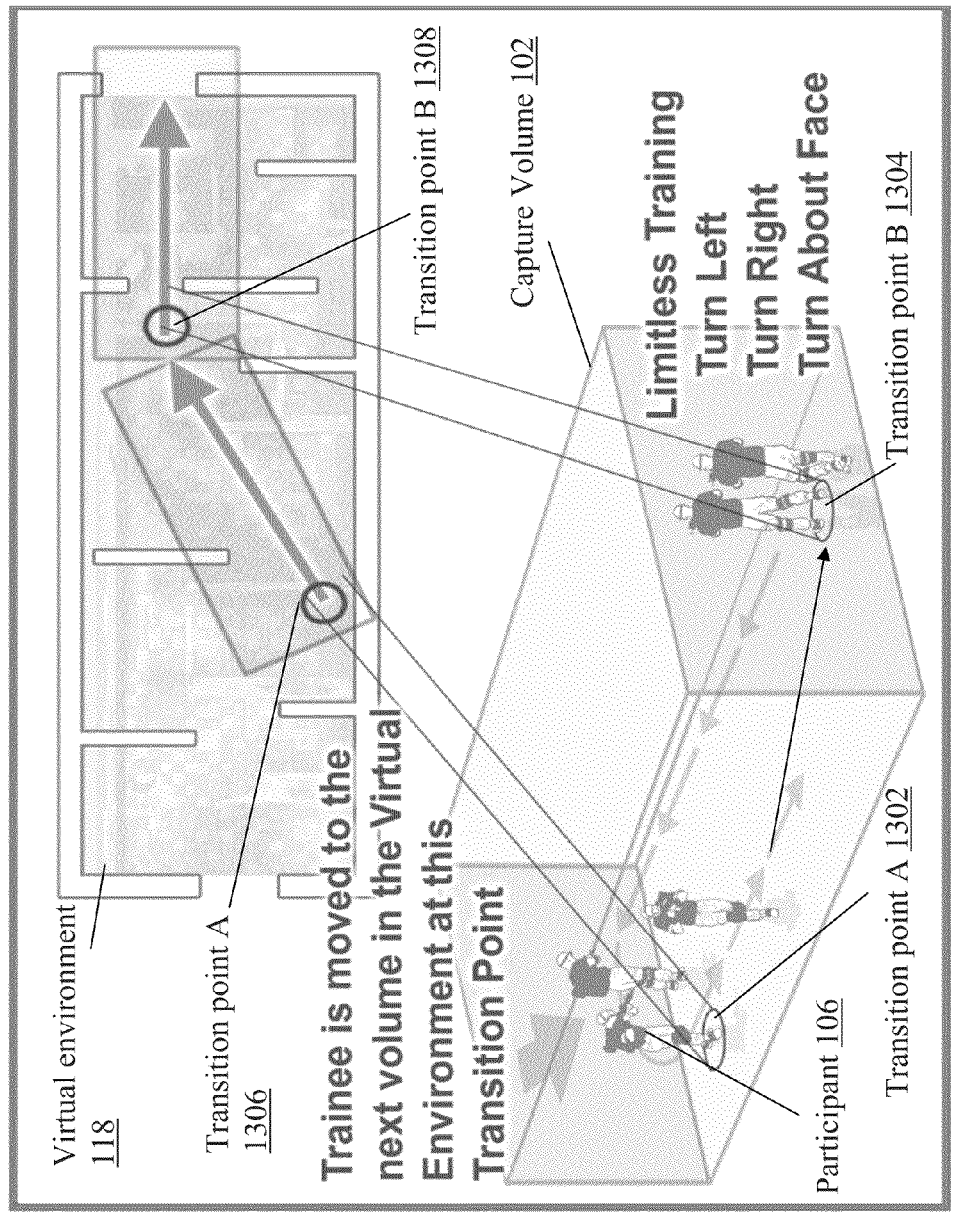
FIG. 13 illustrates extending a participant avatar's operational space in the virtual environment by changing a participant's direction of movement in a capture volume, according to certain exemplary embodiments.
Figure 14:
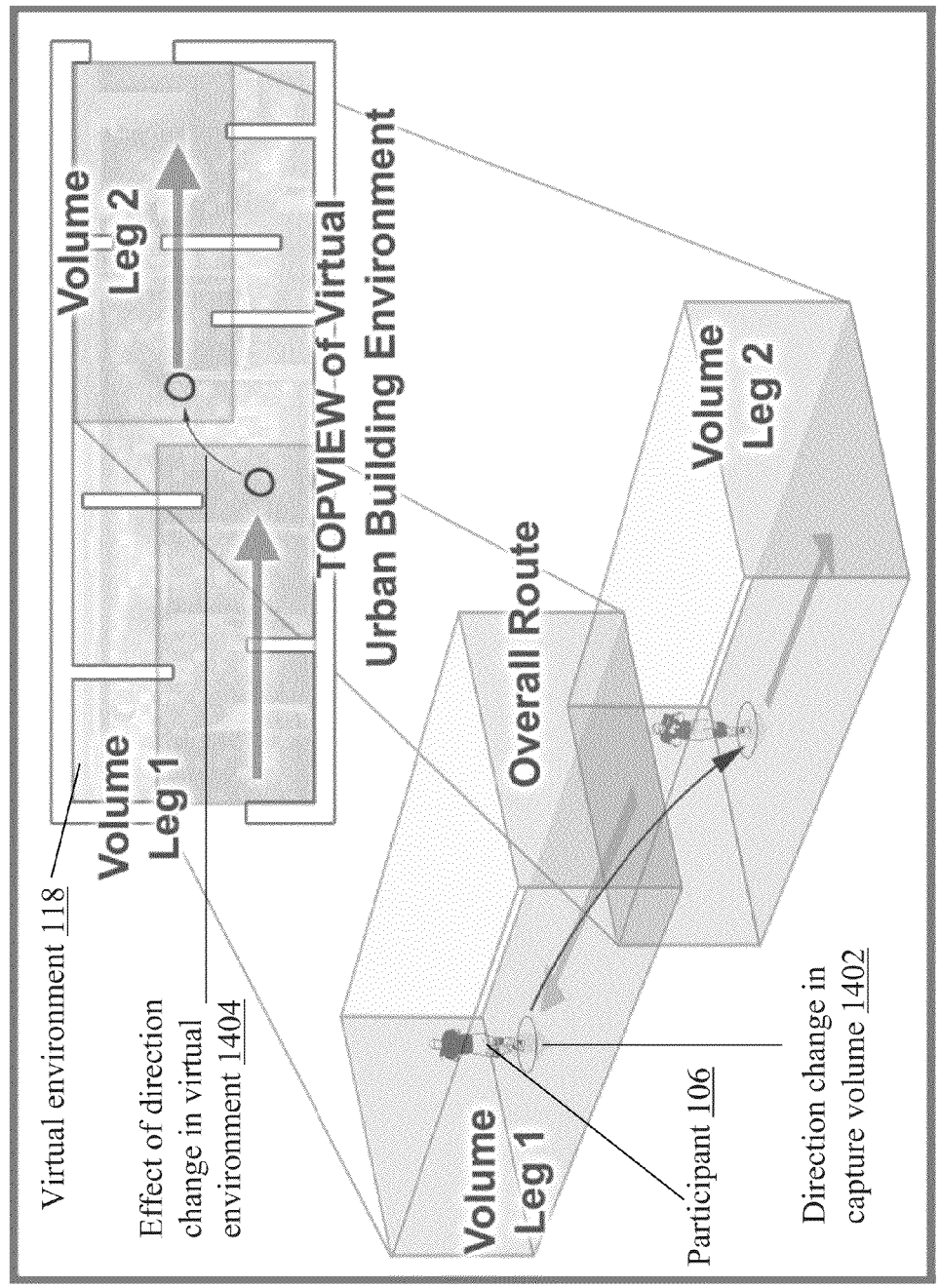
FIG. 14 illustrates changing directions in the capture volume to move from one operational location to another operational location in the virtual environment, according to certain exemplary embodiments of the present invention.

FIGS. 12-14 describe extending a participant avatar's operational space in the virtual environment by changing a participant's direction of movement in a capture volume.

Extending an Operational Environment in the Virtual World by Changing Directions in the Capture Volume Turning to FIG. 12, this figure is a flow chart that illustrates a process of extending a participant avatar's operational space in the virtual environment by changing a participant's direction of movement in a capture volume, according to certain exemplary embodiments.

The process begins with operation 1202 and proceeds to operation 1204. In operation 1204, the initialization unit 302 can register a participant 106 with the motion capture system 100 as described in the foregoing paragraphs associated with FIG. 3. During registration, the initialization unit 302 can associate the participant 106 and/or the participant's wearable computing device 104 in the capture volume with an avatar 116. Once the participant 106 is registered, the participant 106 may join other participant's in the capture volume 102 to take part in a motion capture simulation scenario. In operation 1206, once the participant 106 is in the capture volume 102, the simulator engine 402 can load and initiate a simulation scenario for the participant 106.

In operation 1208, the simulation engine 402 can receive a motion capture data associated with the participant 106 in the capture volume 102. In operation 1210, using the motion capture data of the participant 106 in the capture volume 102, the simulator engine 402 can drive the participant's avatar 116 in the virtual environment 118. In other words, the participant's avatar 116 can be moved in the virtual environment based on the participant's movement in the capture volume 102.

In an example embodiment, the participant's avatar 116 can be moved in a first direction based on the participant's movement in the first direction in the capture volume 102. As the participant 106 moves in the first direction in the capture volume to drive the participant's avatar 116, the participant 106 may reach a boundary of the capture volume 102. In operation 1212, using the motion capture data, the simulator engine 402 can determine if the participant 106 is reaching a boundary of the capture volume 102. In certain embodiments, the simulator engine 402 can determine if the participant 106 is in a threshold distance from the boundary of the capture volume 102. If the participant 106 is not in a threshold distance from the boundary of the capture volume 102, the simulator engine 402 can continue to check if the participant is in a threshold distance from the boundary and continue driving the participant's avatar 116 based on the motion capture data of the participant 106.

Upon determining that the participant 106 is in a threshold distance from the boundary of the capture volume 102, the simulator engine proceeds to operation 1214. In operation 1214, the simulator engine 402 can determine whether the participant desires to continue to move the participant's avatar in the first direction in the virtual environment 118, even though the participant 106 is approaching a boundary along the first direction in the capture volume 102.

Upon determining that the participant 106 desires to move the participant's avatar 116 along the first direction in the virtual environment 118 and the participant 106 is in a threshold distance from the boundary along the first direction in the capture volume 102, the simulator engine 402 proceeds to operation 1216. One of ordinary skill in the art will understand and appreciate that in some embodiments, operation 1214 can be omitted without departing from the broader spirit of the invention.

In one embodiment, an interpretation of the physical movements of the participant 106 in the capture volume 102 may be context dependent. In an example embodiment, the interpretation may depend upon the location of the participant 106 within the capture volume 102. For example, if a participant 106 is near a physical boundary of the capture volume 102 and the participant 106 changes a direction of movement to a second direction, a simulator engine 402 may not always continue to move the avatar in the first direction based on the change in direction of the participant. In other words, the simulator engine 402 can be configured such that under appropriate conditions, a change of direction of movement by the participant 106 in the capture volume 102, may be presented in the virtual environment as a continued movement in the same direction further into the larger virtual volume.

In operation 1216, the simulator engine 402 can provide an indication to the participant that the participant is in a threshold distance from the boundary in the capture volume 102. In one embodiment, the indication can be a visual alert displayed to the participant through the HMD 112. In another embodiment, the indication can be an auditory, tactile and/or an olfactory alert.

On receiving the indication, the participant 106 can change a direction of movement to a second direction in the capture volume 102. In one embodiment, the second direction can be opposite to the first direction. In another embodiment, the second direction may be any direction that is different than the first direction. In other words, the participant 106 can change a direction of movement such that the participant avoids being constrained by the approaching boundary along the first direction in the capture volume 102. For example, the participant may walk back and forth between two boundaries i.e., laps of the capture volume or the participant may choose to walk along the perimeter of the capture volume instead of walking back and forth. In operation 1218, when the participant changes a direction of movement to a second direction in the capture volume 102, the simulator engine 402 can apply a transformation to the motion capture data of the participant 106 such that even though the participant 106 moves along a second direction, the participant's avatar 116 is moved along a first direction in the virtual environment 118. Thus a correlation between the movement of the avatar and movement of the person can be changed. In other words, the participant 106 can keep changing directions as and when the participant approaches a boundary of the capture volume 102 while keeping the participant's avatar 116 moving along a desired direction in the virtual environment 118 thereby, extending an operational space of the participant's avatar 116 in the virtual environment 118 even though the participant's movements may be limited to confines of the capture volume 102.

As discussed in the foregoing paragraph, when the participant 106 changes a direction of movement in the capture volume 102 because of an approaching boundary, the simulator engine 402 can apply a transformation to the motion capture data. In one embodiment, applying a transformation can include modifying a rotational component about a vertical axis of a transformation that maps the participant 106 from the capture volume 102 to the virtual environment 118. In another embodiment, when the participant changes a direction of movement because of an approaching boundary, the simulator engine 402 can reorient the virtual environment 118 in such a way that an effect of the change in the participant's direction in the capture volume 102 may not be reflected in the virtual environment 118. For example, if a participant 106 walks in a first direction and reaches a boundary in the capture volume 102, the participant 106 may turn around and walk in a second direction that is opposite to the first direction. Since the participant 106 turns around in the capture volume 102, the participant's avatar 116 may be turned around in the virtual environment 116 based on motion capture data. When the participant's avatar 116 is turned around in the virtual environment 118, the simulator engine 402 may rotate (e.g., re-orient) the virtual environment 118 such that the participant's avatar 116 faces the first direction in the virtual environment 118 even though the participant is facing a second direction in the capture volume 102.

In certain embodiments, when there are multiple participants in the capture volume 102, represented by their respective avatars in the virtual environment 118, the virtual environment is reoriented from the perspective of one participant. Under these conditions it is possible that appropriate reorientations of multiple participants may be generated based upon the behavior of a single participant. In an example embodiment, the one participant can be a leader participant. The leader participant may be pre-assigned as leader of the group of participants prior to the simulation during registration.

In an example embodiment, when an activity (e.g., mission) in an operational location in the virtual environment has been completed, the participant 106 in the capture volume 102 can change a direction of movement in order to change an operational location in the virtual environment 118 or to start a new activity in a new operational location. In the foregoing example embodiment, the participant 106 can change a direction of movement in the capture volume 102 even if the participant is not in a threshold distance from the boundary. In the foregoing example embodiment, the participant 106 can change a direction of movement in the capture volume 102 based on the simulation scenario. For example, when a mission on the first floor of a building in the virtual environment 118 has been completed, the participant's can change a direction of movement in the capture volume 102 to indicate that the avatar be relocated to the third floor of the building for a new mission in the virtual environment 118. The different example embodiments described in the foregoing paragraphs may be illustrated in greater detail in FIGS. 13 and 14. One of ordinary skill in the art can understand and appreciate that even though a change in direction is specifically mentioned, any appropriate action by the participant such as a gesture or other movements that can signal a transition can be used to change an operational location in the virtual environment.

Turning now to FIG. 13, this figure illustrates extending a participant avatar's operational space in the virtual environment by changing a participant's direction of movement in a capture volume, according to certain exemplary embodiments. As illustrated in FIG. 13 the participant 106 can move in the capture volume 102 by changing directions (e.g., performing laps) when the participant reaches the boundary of the capture volume 102. The participant's avatar 116 may be moved in the virtual environment based on the participant's movement in the capture volume 102. As the participant's avatar 116 is moved along a distance in the virtual environment 118 based on the participant's movement along the distance in the capture volume 102, the participant 106 may approach a boundary of the capture volume 102. When the participant 106 is at a threshold distance from the boundary of the capture volume 102, the participant 106 can change a direction of movement in the capture volume 102, but still desire to maintain the same direction in the virtual environment 118. When the participant 106 changes the direction of movement, the simulator engine 402 can modify the rotational component about a vertical axis of the transformation that maps the participant from the capture volume 102 to the virtual environment 118. Modifying the transformation can enable the participant to continue along one desired direction in the virtual environment 118 even though the participant 106 changes directions in the capture volume 102. In an example embodiment, as the participant 106 changes direction as illustrated by transition point A 1302 and transition point B 1304, the participant's avatar is moved from a first volume to a second volume as illustrated by the transition point A 1306 and the transition point B 1308 in the virtual environment 118. In an example embodiment, the first volume and the second volume may be next to each other in the virtual environment 118. In another example embodiment, the first volume and the second volume may be remote from each other in the virtual environment 118.

Turning to FIG. 14, this figure illustrates changing directions in the capture volume to move from one operational location to another operational location in the virtual environment, according to certain exemplary embodiments of the present invention. In one embodiment, the participant 106 can move the participant's avatar 116 from one operational location to another operational location in the virtual environment 118 at discrete times as fits the simulation scenario by changing the direction of movement or performing some other appropriate choreographed movement in the capture volume as illustrated by 1404. As illustrated in FIG. 14, as the participant 106 completes the first leg of movement in the capture volume 102 (e.g., Volume leg 1 in the capture volume), correspondingly the participant's avatar 116 clears the first floor of a building in the virtual environment (e.g., Volume leg 1 in the virtual environment). Once the first floor of the building is cleared in the virtual environment 118, the participant can change a direction of movement 1402 in the capture volume 102. Responsive to changing a direction of movement 1402 in the capture volume, an operational location of the participant's avatar 116 can be changed to the second floor of the building to allow the participant to complete a second leg of the mission. To change the operational location of a the participant's avatar in the virtual environment, the simulator engine 402 can update a transformation that maps the capture volume 102 to a first operational location in the virtual environment 118, to another transformation that maps the capture volume 102 to a second operational location in the virtual environment 118.

Referring back to FIG. 12, the process of extending a participant avatar's operational space in the virtual environment, by changing a participant's direction of movement in a capture volume 102, ends in operation 1220.

Although specific operations are disclosed in the flowcharts illustrated in FIGS. 6, 7, 9, and 12, such operations are exemplary. That is, embodiments of the present invention are well suited to performing various other operations or variations of the operations recited in the flowcharts. It is appreciated that the operations in the flowcharts illustrated in FIGS. 6, 7, 9, and 12 may be performed in an order different that presented, and that not all of the operations in the flowcharts may be performed.

All, or a portion of, the embodiments described by the flowcharts illustrated in FIGS. 6, 7, 9, and 12 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described above.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for moving an avatar in a virtual environment based on movement of a person in a motion capture volume, the method comprising:

determining that the person is approaching a physical boundary of the motion capture volume, wherein the motion capture volume is bounded by the physical boundary; and in response to the determination that the person is approaching the physical boundary of the motion capture volume, changing a correlation between a movement of the avatar and the movement of the person when the person changes a direction of the movement to avoid collision with the physical boundary, wherein changing the correlation between the movement of the avatar and the movement of the person comprises maintaining a direction of the movement of the avatar in the virtual environment when the person changes the direction of the movement in the motion capture volume.

2. The method of claim 1, further comprising modifying a transformation that maps the person from the motion capture volume to the virtual environment to change the correlation between the movement of the avatar and the movement of the person.

3. The method of claim 1, further comprising reorienting the virtual environment to change the correlation between the movement of the avatar and the movement of the person.

4. The method of claim 1, further comprising providing an indication to the person that the person is approaching the physical boundary of the motion capture volume to avoid collision with the physical boundary.

5. The method of claim 1, further comprising displaying the virtual environment to the person in the motion capture volume via a head mounted display equipment of the person.

6. The method of claim 1, further comprising applying a first transformation that maps the person to a coordinate system representing the motion capture volume; and applying a second transformation that maps the person from the coordinate system representing the motion capture volume to a coordinate system representing the virtual environment.

7. A system comprising:
a simulator engine configured to:
move a participant's avatar in a direction in a virtual environment based on a movement of the participant in the direction in a motion capture volume;
determine if the participant is within a threshold distance from a boundary of the motion capture volume;
if the participant is within the threshold distance, then move the participant's avatar in the direction based on the movement of the participant in another direction;
determining if the participant desires to change an operational location of the participant's avatar in the virtual environment based on a simulation scenario; and
responsive to a positive determination, change the operational location of the participant's avatar in the virtual environment based on a change in direction of movement of the participant from the direction to the another direction in the motion capture volume independent of whether the participant is within the threshold distance from the boundary of the motion capture volume.

8. The system of claim 7, wherein the simulator engine is configured to modify a transformation that maps the participant from the motion capture volume to the virtual environment to move the participant's avatar in the direction based on movement of the participant in the another direction.

9. The system of claim 7, wherein the direction and the another direction are opposite to one another.

10. The system of claim 7, wherein the direction and the another direction are different from one another.

11. The system of claim 7, wherein the simulator engine is configured to reorient the virtual environment to move the participant's avatar in the direction based on movement of the participant in the another direction.

12. The system of claim 7, wherein the simulator engine is configured to provide an indication to the participant that the participant is within the threshold distance from the boundary of the motion capture volume.

13. A method for moving an avatar of a person in a virtual environment based on a motion of the person in a capture volume, the method comprising:
moving the avatar along a vector responsive to the person moving in a first direction while disposed in the capture volume;
responsive to determining that the person is within a threshold distance from a boundary of the capture volume, moving the avatar along the vector responsive to the person moving in a second direction while disposed in the capture volume, the first direction different than the second direction; and
responsive to determining that an operational location of the avatar is to be changed based on a simulation scenario, changing the operational location of the avatar in the virtual environment based on the person changing a direction of movement from the first direction to the second direction while disposed in the capture volume.

14. The method of claim 13, wherein moving the avatar along the vector responsive the person moving in the second direction comprises modifying a rotational component of a transformation about a vertical axis, wherein the transformation maps the person from the capture volume to the virtual environment.

15. The method of claim 13, wherein moving the avatar along the vector responsive the person moving in the second direction comprises reorienting the virtual environment responsive to the person moving in the second direction.

16. The method of claim 13, further comprising displaying the virtual environment to the person in the capture volume via a head mounted display equipment of the person.

* * * * *